United States Patent
Baldwin et al.

(10) Patent No.: US 12,523,655 B2
(45) Date of Patent: Jan. 13, 2026

(54) LEAF MARKERS FOR ROOT COLONIZATION BY ARBUSCULAR MYCORRHIZAL FUNGI IN PLANTS

(71) Applicant: MAX-PLANCK-GESELLSCHAFT ZUR FÖRDERUNG DER WISSENSCHAFTEN E.V., Munich (DE)

(72) Inventors: Ian T. Baldwin, Jena (DE); Rayko Halitschke, Bucha (DE); Ming Wang, Jena (DE); Dapeng Li, Jena (DE); Martin Schäfer, Münster (DE); Erica McGale, Morges (CH); Sven Heiling, Jena (DE)

(*) Notice: Subject to any disclaimer, the term of this patent is extended or adjusted under 35 U.S.C. 154(b) by 660 days.

(21) Appl. No.: 16/970,608

(22) PCT Filed: Feb. 26, 2019

(86) PCT No.: PCT/EP2019/054738
§ 371 (c)(1),
(2) Date: Aug. 17, 2020

(87) PCT Pub. No.: WO2019/166437
PCT Pub. Date: Sep. 6, 2019

(65) Prior Publication Data
US 2021/0088516 A1   Mar. 25, 2021

(30) Foreign Application Priority Data
Feb. 27, 2018   (EP) .................................... 18158922

(51) Int. Cl.
*G01N 33/569* (2006.01)
*A01G 18/10* (2018.01)
(Continued)

(52) U.S. Cl.
CPC ....... *G01N 33/56961* (2013.01); *A01G 18/10* (2018.02); *A01H 17/00* (2013.01);
(Continued)

(58) Field of Classification Search
None
See application file for complete search history.

(56) References Cited

FOREIGN PATENT DOCUMENTS

WO   WO199943203   9/1999
WO   WO2013177615  12/2013

OTHER PUBLICATIONS

Hill et al. "Arbuscular Mycorrhizal Fungi and Plant Chemical Defence: Effects of Colonisation on Aboveground and Belowground Metabolomes" Feb. 2, 2018 J. Chem. Ecology 44:198-208 (Year: 2018).*

(Continued)

*Primary Examiner* — Matthew R Keogh
*Assistant Examiner* — Rebecca Stephens
(74) *Attorney, Agent, or Firm* — PERDUE IP LAW, APC; Donna O. Perdue

(57) ABSTRACT

The invention relates to a method of determining an association of a first plant with an arbuscular mycorrhizal fungus (AMF), said method comprising comparing the amount of a blumenol in an aerial part of said first plant to the amount of said blumenol in an aerial part of a second plant, wherein said second plant belongs to the same species as said first plant, and wherein an increased amount is indicative of increased association in said first plant as compared to said second plant, and a decreased amount is indicative of decreased association.

12 Claims, 9 Drawing Sheets

Figure 1:
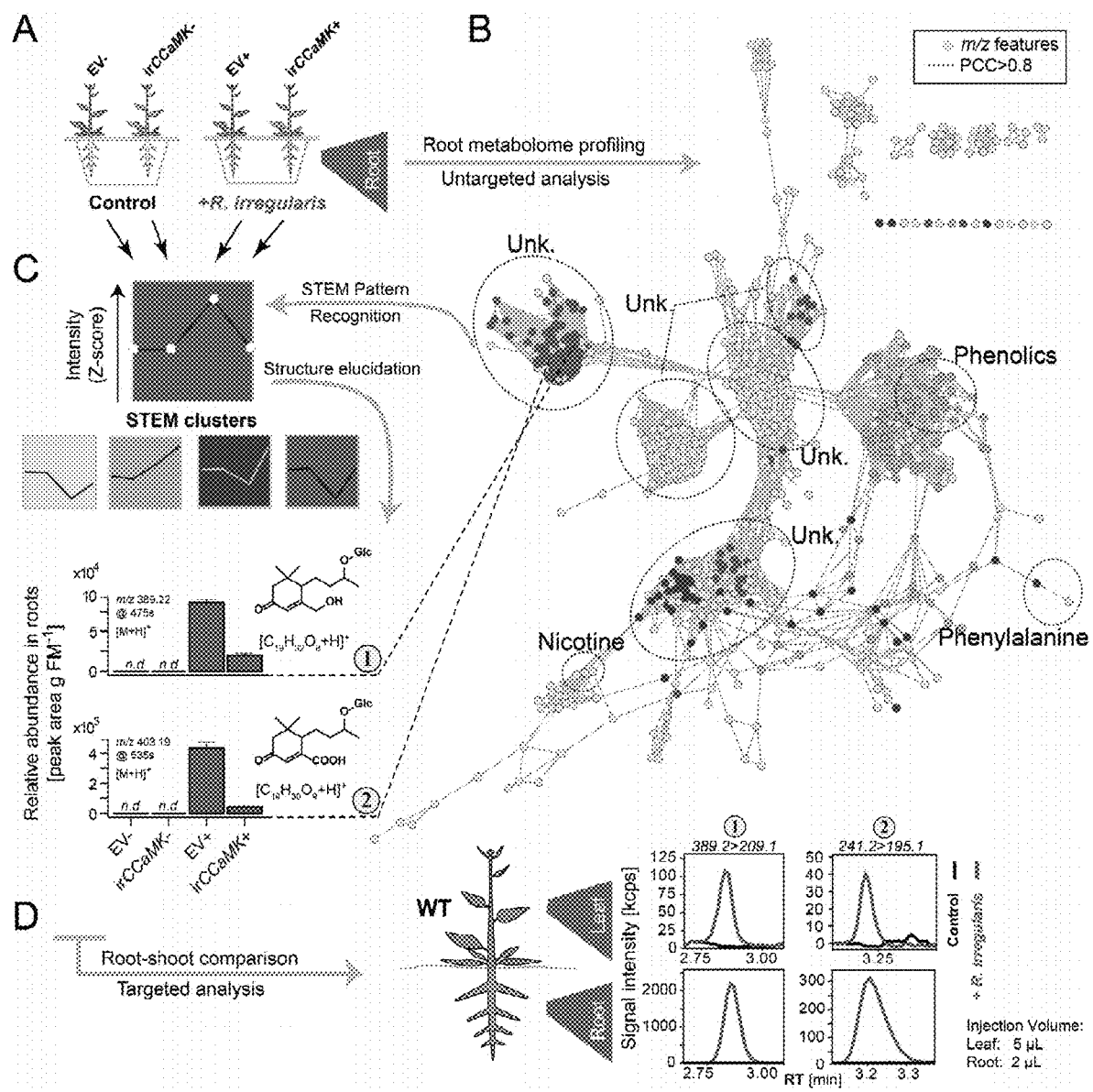

(51) Int. Cl.
*A01H 17/00* (2006.01)
*C12N 15/82* (2006.01)
(52) U.S. Cl.
CPC ..... *C12N 15/8218* (2013.01); *C12N 15/8243* (2013.01); *C12N 15/8282* (2013.01)

(56) References Cited

OTHER PUBLICATIONS

Schliemann et al. "Accumulation of apocarotenoids in mycorrhizal roots of Ornithogalum umbellatum" 2006 Phytochemistry 67: 1196-1205. (Year: 2006).*
Adolfsson et al. ("Enhanced Secondary- and Hormone Metabolism in Leaves of Arbuscular Mycorrhizal Medicago truncatula" 2017 Plant Physiology 175:392-411; of record IDS Aug. 17, 2020). (Year: 2017).*
Hill et al. ("Arbuscular Mycorrhizal Fungi and Plant Chemical Defence: Effects of Colonisation on Aboveground and Belowground Metabolomes" Feb. 2, 2018 J. Chemical Ecology 44:198-208; of record IDS Aug. 17, 2020). (Year: 2018).*
Schweiger et al. 2014 Nature Communications 5:3886 (11 total pages) DOI: 10.1038/ncomms4886. (Year: 2014).*
Adolfsson Lisa, et al., "Enhanced Secondary- and Hormone Metabolism in Leaves of Arbuscular Mycorrhizal Medicago truncatula", Plant Physiology, vol. 175, No. 1, Jul. 11, 2017 (Jul. 11, 2017), p. 392-411, XP055496922 / DOI: 10.1104/pp. 16.01509 / ISSN:0032-0889.
Hill Elizabeth M., et al., "Arbuscular Mycorrhizal Fungi and Plant Chemical Defence: Effects of Colonisation on Aboveground and Belowground Metabolomes", Feb. 2, 2018 (Feb. 2, 2018), vol. 44, No. 2, p. 198-208, XP036452043 / DOI: 10.1007/S10886-017-0921-1 / ISSN:0098-0331.
Schweiger Rabea, et al., "Leaf metabolome in arbuscular mycorrhizal symbiosis", Current Opinion in Plant Biology, vol. 26, Jul. 17, 2015 (Jul. 17, 2015), p. 120-126 XP029269261 / DOI: 10.1016/J.PBI.2015.06.009 / ISSN:1369-5266.
Wang Ming, et al., "Blumenols as shoot markers of root symbiosis with arbuscular mycorrhizal fungi", ELIFE, vol. 7, Aug. 28, 2018 (Aug. 28, 2018) XP055590683 / DOI: 10.7554/eLife.37093.
Declaration of Dr. Rayko Halitschke filed in the European Patent Office (EPO) in corresponding application EP 19711248 on Aug. 29, 2022 ("the Halitschke Declaration").
Matsunami K., Otsuka H., Takeda Y. Miyase T. Reinvestigation of the Absolute Stereochemistry of Megastigmane Glucoside, Icariside B5. Chem. Pharm. Bull. 58(10) 1399-1402 (2010), filed in EPO in corresponding application EP 19711248 on Aug. 29, 2022, as Exhibit 2 of the Halitschke Declaration.
Exhibit 3 of the Halitschke Declaration filed in EPO in corresponding application EP 19711248 on Aug. 29, 2022, showing blumenol structures and properties.
Supplemental online material related to Adolfsson et al. (Plant Physiology 175(1) 392-411 (2017) The Halitschke Declaration, filed in the EPO in corresponding application EP 19711248 on Aug. 29, 2022, . Available at https://academic.oup.com/plphys/article/175/1/392/6117013#supplementary-data.
International Preliminary Report on Patentability (IPRP) for International Application No. PCT/EP2019/054738 issued on Sep. 3, 2020.

* cited by examiner

LEAF MARKERS FOR ROOT COLONIZATION BY ARBUSCULAR MYCORRHIZAL FUNGI IN PLANTS

The present invention relates to a method of determining an association of a first plant with an arbuscular mycorrhizal fungus (AMF), said method comprising comparing the amount of a blumenol in an aerial part of said first plant to the amount of said blumenol in an aerial part of a second plant, wherein said second plant belongs to the same species as said first plant, and wherein an increased amount is indicative of increased association in said first plant as compared to said second plant, and a decreased amount is indicative of decreased association.

In this specification, a number of documents including patent applications and manufacturer's manuals are cited. The disclosure of these documents, while not considered relevant for the patentability of this invention, is herewith incorporated by reference in its entirety. More specifically, all referenced documents are incorporated by reference to the same extent as if each individual document was specifically and individually indicated to be incorporated by reference.

Symbiotic interactions between fungi and plants, so called mycorrhiza, are thought to be one of the most important factors that allowed for the colonization of terrestrial habitats by plants (Brundrett and Tedersoo (2018) Evolutionary history of mycorrhizal symbioses and global host plant diversity. *New Phytologist* doi:10.1111/nph.14976). One of the most prominent forms is the arbuscular mycorrhiza (AM), which can be formed by many of the higher plants, including crop plants. AM is named after characteristic hyphal structures that are formed by an arbuscular mycorrhizal fungus (AMF) within cortical cells of the colonized plant root. These so called arbuscules are the main sites of the exchange of resources between the plant and the fungus. While the fungus facilitates the uptake of mineral nutrients, in particular phosphorous (P) and nitrogen, as well as water, the plant supplies the fungus with carbon energy reserves via photosynthates (Baier et al. (2010) Knockdown of the symbiotic sucrose synthase MtSucS1 affects arbuscule maturation and maintenance in mycorrhizal roots of *Medicago truncatula*. *Plant Physiology* 152, 1000-1014; Doidy et al. (2012). The *Medicago truncatula* sucrose transporter family: characterization and implication of key members in carbon partitioning towards arbuscular mycorrhizal fungi. *Molecular Plant* 5, 1346-1358; Marschner and Dell (1994) Nutrient uptake and mycorrhizal symbiosis. *Plant and Soil* 159, 89-102). P is a major limiting factor for plant growth under terrestrial, freshwater and marine conditions (Elser et al. (2007) Global analysis of nitrogen and phosphorus limitation of primary producers in freshwater, marine and terrestrial ecosystems. *Ecology Letters* 10, 1135-1142) and even when present in sufficient amounts in a plant's environment, it is often in forms not available to plants (Bieleski (1973) Phosphate pools, phosphate transport, and phosphate availability. *Annual Review of Plant Physiology* 24, 225-252; Schachtman et al. (1998) Phosphorus uptake by plants: From soil to cell. *Plant Physiology* 116, 447-453). Therefore, vast amounts of P-fertilizers are used in high intensity agriculture (MacDonald et al. (2011) Agronomic phosphorus imbalances across the world's croplands. *Proceedings of the National Academy of Sciences of the United States of America* 108, 3086-3091), which contributes substantially to the eutrophication of our waters (Smith and Schindler (2009) Eutrophication science: where do we go from here? *Trends in Ecology & Evolution* 24, 201-207). Additionally, the P used for fertilizers is derived from phosphate rock—a non-renewable resource—and it is predicted that these reserves will soon be depleted (Cordell et al. (2009) The story of phosphorus: Global food security and food for thought. *Global Environmental Change* 19, 292-305; Vaccari and Strigul (2011) Extrapolating phosphorus production to estimate resource reserves. *Chemosphere* 84, 792-797). It is well known, that AMF can promote plant growth under P-limiting conditions (Rooney et al. (2009) Mycorrhizas and biomass crops: opportunities for future sustainable development. *Trends in Plant Science* 14, 542-549; Adolfsson et al. (2015) Mycorrhiza symbiosis increases the surface for sunlight capture in *Medicago truncatula* for better photosynthetic production. *PLoS ONE* 10, e0115314; Nouri et al. (2014) Phosphorus and nitrogen regulate arbuscular mycorrhizal symbiosis in *Petunia hybrida*. *PLoS One* 9, e90841) and hence a way forward is to improve the P-uptake efficiency of our crop plants by breeding for enhanced AMF associations (van de Wiel et al. (2016) Improving phosphorus use efficiency in agriculture: opportunities for breeding. *Euphytica* 207, 1-22). While breeding for enhanced AMF associations has not been a priority during the time of inexpensive P-based fertilizers, and domestication led even to disruptions in the efficiency of the AMF symbiosis in crop plants (Martin-Robles et al. (2017) Impacts of domestication on the arbuscular mycorrhizal symbiosis of 27 crop species. *New Phytologist* doi: 10.1111/nph.14962), this is clearly changing. Associations with AMF are also known to increase a plant's resistance against disease and abiotic stresses such as salinity, drought or heavy metals, and hence breeding for AMF associations can provide a number of high-value benefits for agricultural production (Whipps (2004) Prospects and limitations for mycorrhizas in biocontrol of root pathogens. *Canadian Journal of Botany* 82, 1198-1227; Nadeem et al. (2014) The role of mycorrhizae and plant growth promoting rhizobacteria (PGPR) in improving crop productivity under stressful environments. *Biotechnology Advances* 32, 429-448; Hohmann and Messmer (2017) Breeding for mycorrhizal symbiosis: focus on disease resistance. *Euphytica* 213, 11). To improve the implementation of AM in future agricultural strategies, it will be necessary to develop a rapid and easy-to-conduct screening method that provides reliable information about the plant-AMF-interaction.

Unfortunately, analyzing AMF-colonization is a tedious and destructive process—e.g., microscopic or nucleic acid analysis of root tissues (see, e.g. Chinese patent applications CN 106011256 and CN 106566869) is required. These processes are laborious, costly and time-consuming and not compatible with the high throughput (HTP) requirements of breeding programs. Therefore, developing an efficient HTP approach to the characterization of AMF-associations is a high-value target. To circumvent the tedious and destructive harvest and analysis of root material, various studies tried to identify suitable markers of AMF associations in the more readily accessed aerial plant parts. Peipp et al. ((1997) Arbuscular mycorrhizal fungus-induced changes in the accumulation of secondary compounds in barley roots. *Phytochemistry* 44, 581-587) analyzed metabolites in the root and shoot tissues of mycorrhized and non-mycorrhized plants and reported: "no obvious differences observed from extracts of the shoots of mycorrhized and non-mycorrhized plants". Later studies found various metabolic and transcriptional changes related to primary and secondary metabolism (Taylor and Harrier (2003) Expression studies of plant genes differentially expressed in leaf and root tissues of tomato colonised by the arbuscular mycorrhizal fungus *Glomus*

*mosseae. Plant Molecular Biology* 51, 619-629; Kogel et al. (2010) Transcriptome and metabolome profiling of field-grown transgenic barley lack induced differences but show cultivar-specific variances. *Proceedings of the National Academy of Sciences of the United States of America* 107, 6198-6203; Adolfsson et al. (2017) Enhanced secondary- and hormone metabolism in leaves of arbuscular mycorrhizal *Medicago truncatula. Plant Physiology* 175, 392-411). However, the shoot features that were found to be upregulated in response to AMF-interaction are also known to respond to various stimuli, making them inappropriate as specific and reliable markers of AMF colonization: e.g., jasmonate found by Aliferis et al. ((2015) Metabolic responses of willow (*Salix purpurea* L.) leaves to mycorrhization as revealed by mass spectrometry and $^1$H NMR spectroscopy metabolite profiling. *Frontiers in Plant Science* 6, 344) is a classical defense regulator against herbivores. The results of Kogel et al. ((2010) Transcriptome and metabolome profiling of field-grown transgenic barley lack induced differences but show cultivar-specific variances. *Proceedings of the National Academy of Sciences of the United States of America* 107, 6198-6203) indicate that metabolite analysis is likely more suitable for analyzing AM-mediated changes in plant shoots than transcript analyses. A recent review by Schweiger and Müller ((2015) Leaf metabolome in arbuscular mycorrhizal symbiosis. *Current Opinion in Plant Biology* 26, 120-126) of the studies that had conducted leaf metabolomics of plants harboring AMF symbiosis came to the following conclusion: "AM-mediated effects on the leaf metabolome are highly diverse, with a plethora of metabolite classes being specifically modified in numerous plant species across various taxa. Even within the more conserved primary metabolism, no common response patterns to AM were found." As such, no shoot metabolite or molecular markers with properties that would allow for a reliable and specific detection of the degree of AMF colonization have so far been identified.

Blumenol-type metabolites were found to accumulate in the roots of plants colonized by AMF (Reviewed by Strack and Fester (2006) Isoprenoid metabolism and plastid reorganization in arbuscular mycorrhizal roots. *New Phytologist* 172, 22-34). Earlier reports indicate a constitutive level of some blumenols in aerial plant parts and the compounds were also found in plant families that are known to have lost their ability to establish AMF interactions (Brassicaceae: Cutillo et al. ((2005) $C_{13}$ norisoprenoids from *Brassica fruticulosa. Natural Products Research* 19, 99-103); Urticaceae: Aishan et al. ((2010) The constituents of *Urtica cannabina* used in Uighur medicine. *Pharmaceutical Biology* 48, 577-583)). Adolfsson et al. ((2017) Enhanced secondary- and hormone metabolism in leaves of arbuscular mycorrhizal *Medicago truncatula. Plant Physiology* 175, 392-411) analyzed blumenol accumulations together with other metabolites in leaves of plants with and without AMF colonization, but did not observe AMF-specific up-regulation of blumenols or transcripts specific for their biosynthesis. Some blumenol derivatives were even found to be down-regulated with AMF colonization.

The technical problem underlying the present invention can be seen in the provision of improved means and methods for determining root colonization by AMFs in plants. This technical problem is solved by the subject-matter of the enclosed claims.

Accordingly, the present invention, in a first aspect, relates to a method of determining an association of a first plant with an arbuscular mycorrhizal fungus (AMF), said method comprising comparing the amount of a blumenol in an aerial part of said first plant to the amount of said blumenol in an aerial part of a second plant, wherein said second plant belongs to the same species as said first plant, and wherein an increased amount is indicative of increased association in said first plant as compared to said second plant, and a decreased amount is indicative of decreased association.

It is understood that the term "association" refers to a functional association. It is known in the art that AMFs penetrate the cortical cells of the roots of vascular plants. During the formation of the functional association between the fungus and the plant, the cortical cells change their morphology. This includes the appearance of structures referred to as arbuscules. The term "association" includes the formation of arbuscules.

Related to the above, the term "colonization" which is also used in the present specification designates the process of forming said association. The capability of a given fungus to colonize a given plant implies that an association can be formed between said plant and said fungus.

The class of compounds in accordance with the invention, which is indicative of an association, are blumenols. Blumenols are cleavage products of carotenoids. They comprise a cyclohexenone-containing moiety which has typically thirteen carbon atoms. This moiety may be further derivatized, for example, with saccharides, carboxylated and/or hydroxylated. To the extent blumenols are glycosylated, the above mentioned cyclohexenone-containing moiety is usually referred to as aglycon. Preferred blumenols in accordance with the invention are blumenol C and blumenol B as well as their derivatives, preferred derivatives being glycosylated, carboxylated and/or hydroxylated. Additionally, a double bond might be introduced to the butyl-side chain of blumenol C. Blumenol C is known in art (4-(3-hydroxybutyl)-3,5,5-trimethylcyclohex-2-en-1-one). Blumenol B is known in art (4-hydroxy-4-(3-hydroxybutyl)-3,5,5-trimethylcyclohex-2-en-1-one). Preferred blumenols in accordance with the present invention are the subject of a preferred embodiment disclosed further below. Blumenol A and its derivatives are less preferred.

The term "determining" includes both qualitative and quantitative assessments of said association. To give an example (further examples and preferred embodiments are given below), the recited second plant may be a plant which is known to be entirely free of any association with an AMF. Under such circumstances, an increased amount determined in the first plant is indicative of the presence of an association. If, on the other hand, said second plant has an association with an AMF, an increased amount in the first plant is indicative of a higher degree of association in said first plant and a decreased amount in the first plant is indicative of a lower degree of association in said first plant. The absence or non-detectability of a blumenol in accordance with the invention will generally be indicative of the absence of an association.

In accordance with the first aspect, first and second plant are of the same species. The amount of blumenol in said second plant typically serves to establish a baseline value or reference state.

Generally speaking, the terms "first plant" and "second plant" have been introduced for reasons of clarity. It is noted that first and second plant may, but do not have to be the same individual, for example, at different points in time.

The term "arbuscular mycorrhizal fungus" has its art-established meaning. It refers to fungi capable of forming the above mentioned arbuscules in the roots of vascular plants. They belong to the phylum Glomeromycota. Preferred AMFs are the subject of a preferred embodiment disclosed further below.

The recited "comparing" implies that the two values that are to be compared to each other are known. As such, the method, in addition to the step of comparing, may also comprise the step or the steps of determining by experimental means one or both of the values to be compared to each other. Such determining, however, does not necessarily have to be performed when practicing the method of the first aspect. To explain further, one or both values to be compared with each other may be taken, for example, from the literature or looked up in databases. To the extent both values to be compared are taken from such sources, an in silico implementation of the method of the first aspect is preferred. In other words, the method may be a computer-implemented method. Preferred implementations require determining the amount of blumenol in said first plant and make use of literature or databases or other sources to look up the amount of said blumenol in said second plant.

It is understood that said first and second plants, to the extent both are associated with an AMF, are either associated with the same AMF species (preferentially the same AMF strain) or the same mixture of AMF species (preferentially the same AMF strains).

The recited amounts (or values) may be single measurements or averages of multiple measurements. In case of multiple measurements, preference is given to the arithmetic mean or median.

To the extent that there is reference to "increased amounts" and "decreased amounts", it is understood that preference is given to statistically significant increases and decreases, respectively. For the purpose of determining statistical significance, information about the variance $\sigma^2$ may be employed. In case of single measurements, the variance may be known from other sources (like literature and databases). Alternatively, and in case of multiple measurements (said multiple measurements either being performed in the course of practicing the method of the first aspect or taken from sources such as literature and databases), both average and variance may be determined from the same data series under consideration. Exemplary or preferred measures of statistical significance are the difference from the mean expressed in multiples of the standard deviation $\sigma$ (such as a difference of 2 or more $\sigma$ being considered significant) or a p-value of 0.05 or less.

The term "amount" has its art-established meaning and embraces mass (e.g. in g), amount of substance (e.g. in mol), and concentration (to be measured in the art-established units such as mol/g plant tissue and g/g plant tissue). Additionally, relative measures of mass, amount of substance and concentration are considered if they are established in the art as direct proxies (e.g., signal intensity of the used detection system).

The term "aerial part" has its art-established meaning and refers to those parts of the plant, which are exposed to air. Accordingly, the term does not embrace parts of the plant in the soil or ground. Preferred aerial parts are disclosed further below.

The first plant is not particularly limited. It may, but does not have to be a plant which is capable of establishing an association with an AMF.

For example, if the second plant is a plant which is free from any association, and the first plant, prior to applying the method in accordance with the first aspect, has been brought into contact for sufficient time with an AMF capable of colonizing, the absence of any detectable amount of a blumenol would be indicative of the first plant having a capacity of forming an association that is below a determined threshold (including not being capable of forming an association).

Otherwise, important applications of the method of the first aspect are in the field of determining the degree of association in those plants which are already known to be capable of establishing an association.

In those instances where it is desired to determine beforehand whether a given plant is capable of establishing an association with an AMF, this can be done by art-established procedures which include microscopic detection (see, e.g. Vierheilig et al. (2005) An overview of methods for the detection and observation of arbuscular mycorrhizal fungi in roots. *Physiologia Plantarum* 125, 393-494) or molecular detection (see, e.g. Park et al. (2015) Hyphal branching during arbuscule development requires reduced arbuscular mycorrhizal. *Plant Physiology* 169, 2774-2788; Alkan et al. (2006) Analysis of quantitative interactions between two species of arbuscular mycorrhizal fungi, *Glomus mosseae* and *G. intraradices*, by Real-Time PCR. *Applied and Environmental Microbiology* 72, 4192-4199; and Gutjahr et al. (2008) Arbuscular mycorrhiza-specific signaling in rice transcends the common symbiosis signaling pathway. *Plant Cell* 20, 2989-3005) of AMF colonization in the roots.

In a number of instances, knowledge about AMF susceptibility is available from the literature.

In the prior art, the occurrence of certain blumenols in roots of plants with an AMF association has been described. The prior art, however, failed to establish a positive correlation between the association of a plant with an AMF and the presence of blumenols in leaves or other aerial parts. To the contrary, for example in Adolfsson et al. ((2017) Enhanced secondary- and hormone metabolism in leaves of arbuscular mycorrhizal *Medicago truncatula*. *Plant Physiology* 175, 392-411) it is described that the levels of certain blumenols decrease after AMF colonization.

Generally, it cannot be expected that metabolites and metabolite responses occurring in one part of the plant could also be found in other parts of plants (e.g. roots vs. aerial parts). Rather, the plant part-specific occurrence of metabolites is typical and well known; see, e.g. Li et al. ((2016) Illuminating a plant's tissue-specific metabolic diversity using computational metabolomics and information theory. *Proceedings of the National Academy of Sciences of the United States of America*, 113, E7610-E7618) and Lee et al. ((2017) What happens in the pith stays in the pith: tissue-localized defense responses facilitate chemical niche differentiation between two spatially separated herbivores. *The Plant Journal*, 92, 414-425).

Furthermore, in the prior art attempts have been made to correlate presence or amount of metabolites occurring in leaves of plants with mycorrhizal colonization. These attempts, however, failed. In particular, no indication can be found in the prior art that blumenols would qualify as mycorrhization markers occurring in aerial parts of plants (see the review of the prior art in the introductory portion herein above).

The present inventors, by relying inter alia on high performance analytical procedures and data analysis methods could establish that blumenols, despite negative findings in the prior art, indeed qualify as markers for mycorrhizal association, wherein said association can be determined on the basis of samples taken from aerial parts of plants.

This provides for significant advantages, noting that established methods for reliably determining mycorrhizal associations require taking samples from the roots of the plants. This is cumbersome and not amenable to quick and high throughput analysis. Samples from the leaves are quickly and easily available and can be obtained by directly collecting leaves or using means such as a hole punch. Additionally, the method introduces only minor damage to the respective plant, whereas root sampling is usually a highly destructive process.

Further advantages of the method of the first aspect include that blumenols are small and stable organic molecules which are amenable to analysis in the mass spectrometer and by spectroscopic techniques on the one hand and on the other hand of sufficient size to be specifically detected by antibodies. Blumenols can be separated from other constituents of the aerial parts of plants by extraction, for example with methanol.

In a preferred embodiment, (a) first and second plants are tracheophytes, preferably monocotyledonous plants, more preferably selected from *Triticum* including *Triticum aestivum*, *Hordeum vulgare*, *Zea mays*, *Allium* including *Allium porrum* and *Allium cepa*, *Phleum pratense*, *Bromus inermis*, *Brachypodium distachyon*, *Pennisetum glaucum*, *Oryza* including *Oryza sativa*, and *Sorghum* including *Sorghum bicolor* and *Sorghum drummondii*, or dicotyledonous plants, more preferably being selected from *Helianthus annuus*, *Lactuca sativa*, *Cynara cardunculus*, *Cucumis sativus*, *Glycine max*, *Lathyrus sativus*, *Lens culinaris*, *Trifolium repens*, *Linum usitatissimum*, *Gossypium hirsutum*, *Sesamum indicum*, *Daucus carota*, *Phaseolus vulgaris*, *Vicia faba*, *Ribes nigrum*, *Capsicum annuum*, *Fragaria* X *ananassa*, *Nicotiana* including *Nicotiana attenuata* and *Nicotiana tabacum*, *Medicago* including *Medicago truncatula* and *Medicago sativa*, and *Solanum* including *Solanum lycopersicum* and *Solanum tuberosum*; and/or (b) said first and said second plant belong to the same subspecies, variety, subvariety, form or subform.

Tracheophytes are also known as vascular plants. It is considered that about 70-80% of the vascular plants can be colonized by AMFs. As noted above, knowledge about the capability of forming an association is not a requirement for a plant to be subjected to the method of the first aspect. To the extent this is desired, this can be assessed either with art-established methods (described herein above) or methods of the invention disclosed further below.

The above enumeration of genera and species is only exemplary and not limiting. As can be seen from the enclosed examples, the present invention has been reduced to practice with a plurality of plants as well as a plurality of AMFs.

As regards item (b) of the above disclosed preferred embodiment, we note that presence of blumenols in response to AMF colonization is conserved in a given species and accordingly also extends to subspecies etc.

In a further preferred embodiment, (a) said aerial part is selected from leaf, shoot, flower, stem, meristem, fruit, seed, capsule, exudates and nectar; and/or (b) the aerial part of said first and the aerial part of said second plant are the same part selected from the list of (a) and/or comprise or consist of the same tissue.

Same parts in accordance with item (b) refer to those preferred embodiments where, e.g. leaves are taken from both first and second plant, or stems are taken from both first and second plant. To the extent plants present a plurality of specific aerial parts (such as younger and older leaves or leaves from the upper part and the lower part of the shoot), preference is given to take samples from corresponding parts of first and second plants.

In a further preferred embodiment, said blumenol is a compound of formula (I) or (II):

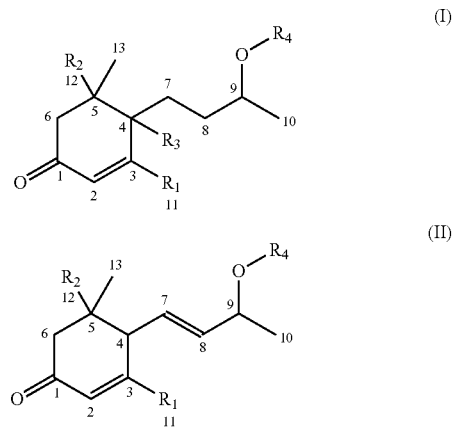

wherein each of $R_1$ and $R_2$ is independently selected from —$CH_3$, —$CH_2OH$, —COOH, and —$CH_2$—O-Glyc; $R_3$ is either —H, —OH or —O-Glyc; $R_4$ is either —H or -Glyc; Glyc is a sugar moiety.

Preferred is that $R_4$ is Glyc.

In case of formula (I), preferred are either
$R_1$ is —$CH_3$, $R_2$ is —$CH_3$, and $R_3$ is —H;
$R_1$ is —$CH_2OH$, $R_2$ is —$CH_3$, and $R_3$ is —H;
$R_1$ is —OOH, $R_2$ is —$CH_3$, and $R_3$ is —H;
$R_1$ is —$CH_3$, $R_2$ is —COOH, and $R_3$ is —H; or
$R_1$ is —$CH_3$, $R_2$ is —$CH_3$, and $R_3$ is —OH.

In case of formula (II), it is preferred that
$R_1$ is —$CH_3$, and $R_2$ is —$CH_3$.

Glyc is preferably selected from -Glc, -Glc-Rha, -MalGlc-Api, -MalGlc, -Glc-Api, -Glc-(Glc)$_2$, -HmgGlc, -Glc-Arb, -(Glc-GlcU)-Rha, -Hmg(MalGlc), -Glc-GlcU, -Glc-Glc, and -MalGlc-GlcU, wherein Glc is glucose, Rha is rhamnose, Mal is malonyl, Api is apiose, Hmg is 3-hydroxy 3-methylglutaryl, Arb is arabinose, and GlcU is glucuronic acid.

The notation used for preferred sugar moieties is adopted from Strack and Fester ((2006) Isoprenoid metabolism and plastid reorganization in arbuscular mycorrhizal roots. New Phytologist 172, 22-34), Schliemann et al. ((2008) Accumulation of apocarotenoids in mycorrhizal roots of leek (*Allium porrum*). Phytochemistry 69, 1680-1688), and Hill et al. ((2018) Arbuscular mycorrhizal fungi and plant chemical defence: Effects of colonisation on aboveground and belowground metabolomes. Journal of Chemical Ecology doi.org/10.1007/s10886-017-0921-1). The compounds as given in these publications define also preferred blumenols in accordance with the present invention.

In particular, preferred are the compounds designated 1 to 19 in Table 1 below (reproduced from Strack and Fester ((2006) Isoprenoid metabolism and plastid reorganization in arbuscular mycorrhizal roots. New Phytologist 172, 22-34)), compounds designated 1 to 11 in Table 2 (reproduced from Schliemann et al. ((2008) Accumulation of apocarotenoids in mycorrhizal roots of leek (*Allium porrum*). Phytochemistry 69, 1680-1688), and compounds designated 1 to 7 in Table 3 (reproduced from Hill et al. ((2018) Arbuscular mycorrhizal fungi and plant chemical defence: effects of colonisation on aboveground and belowground metabolomes. Journal of Chemical Ecology doi.org/10.1007/s10886-017-0921-1).

More preferred is that the glycosyl moiety (abbreviated as Glyc) is selected from glucose; 6'-malonyl glucose; glucose-(1"→4')-glucose; glucose-(1"→6')-glucose; rhamnose-(1"→6')-glucose; arabinose-(1"→6')-glucose; glucuronic acid-(1"→2')-glucose; glucuronic acid-(1"→2')-(6'-malonyl glucose); apiose-(1"→2)-glucose; apiose-(1"→2')-(6'-malonyl glucose); glucose-(1"→2')-(glucose-(1"→6')-glucose); glucuronic acid-(1"→2')-(rhamnose-(1"→6')-glucose); 3'-(3-hydroxy-3-methylglutaryl) glucose; and 3'-(3-hydroxy-3-methylglutaryl) 6'-malonyl glucose. It is preferred that the aglycon is connected as an O-glucoside to the 1' position of the first glucose.

TABLE 1

Structures of glycosylated $C_{13}$ cyclohexenone derivatives isolated from mycorrhizal roots of various plants

| Compound | $R^1$ | $R^2$ | $R^3$ | Occurrence | Reference | Structure scheme |
|---|---|---|---|---|---|---|
| 1 | Glc- | $CH_3$ | $CH_3$ | Mt[a] | W. Schliemann (unpublished) | 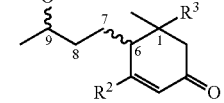 |
| 2 | 6'-MalGlc- | $CH_3$ | $CH_3$ | Mt | W. Schliemann (unpublished) | |
| 3 | Glc(1" → 6')Glc- | $CH_3$ | $CH_3$ | Nt, Nr | Maier et al. (2000) | |
| 4[b] | Glc(1" → 4')Glc- | $CH_3$ | $CH_3$ | Zm | Fester et al. (2002a) | |
| 5 | Rha(1" → 6')Glc- | $CH_3$ | $CH_3$ | Ou | Schliemann et al. (2006) | |
| 6[c] | GlcU(1" → 2')Glc- | $CH_3$ | $CH_3$ | Hv, Ta, Sc, As Zm | Maier et al. (1995) Vierheilig et al. (2000) | |
| 7[d] | GlcU(1" → 2')Glc- | $CH_3$ | $CH_3$ | Hv | Peipp et al. (1997) | |
| 8 | Glc(1" → 6')(Glc1''' → 2')Glc- | $CH_3$ | $CH_3$ | Nt, Nr | Maier et al. (2000) | |
| 9 | Rha(1" → 6')GlcU(1''' → 2')Glc- | $CH_3$ | $CH_3$ | Ou | Schliemann et at. (2006) | |
| 10 | Glc- | $CH_2OH$ | $CH_3$ | Hv Hv, Ta, Sc, As Nt, Nr, Le Ou | Peipp et al. (1997) Maier et al. (1997) Maier et al. (2000) Schliemann et al. (2006) | |
| 11 | 6'-MalGlc- | $CH_2OH$ | $CH_3$ | Mt | W. Schliemann (unpublished) | |
| 12 | Glc-(1" → 6')Glc- | $CH_2OH$ | $CH_3$ | Nt, Nr Hv, Ta, Zm Ou | Maier et al. (1999, 2000) Vierheilig et al. (2000) Walter et al. (2000) Schliemann et al. (2006) | |
| 13 | Rha(1" → 6')Glc- | $CH_2OH$ | $CH_3$ | Ou | Schliemann et al. (2006) | |
| 14 | GlcU(1" → 2')Glc- | $CH_2OH$ | $CH_3$ | Lj | Fester et al. (2005) | |
| 15 | Api(1" → 2')-Glc | $CH_2OH$ | $CH_3$ | Lj | Fester et al. (2005) | |
| 16 | 6'-MalApi(1" → 2')Glc- | $CH_2OH$ | $CH_3$ | Lj | Fester et al. (2005) | |
| 17 | Glc- | COOH | $CH_3$ | Nt, Nr Ou | Maier et al. (2000) Schliermann et al. (2006) | |
| 18 | Glc(1" → 6')Glc- | COOH | $CH_3$ | Nt, Nr Hy, Ta, Zm | Maier et al. (2000) Vierheilig et al. (2000) | |
| 19 | Glc- | $CH_3$ | COOH | Le | Maier et al. (2000) | |

In all compounds listed: Api, β-apiose; Glc, β-glucose; Rha, rhamnose; GlcU, β-glucuronate; Mal, malonyl.
[a]As, *Avena sativa*; Hv, *Hordeum vulgare*; Le, *Lycopersicon esculentum*; Lj, *Lotus japonicus*; Mt, *Medicago truncatula*; Nr, *Nicotiana rustica*; Nt, *Nicotiana tabacum*; Ou, *Ornithogalum umbellatum*; Sc, *Secale cereale*; Ta, *Triticum aestivum*; Zm, *Zea mays*.
[b]Hydrolysis product of components of the AM-specific yellow pigmentation of roots.
[c]Blumenin that was also identified in various members of the Aveneae, Poeae and Triceae, along with compound 10 and sporadically compound 7.
[d]$\Delta^{7,8}$ present.

TABLE 2

Retention time, HPLC-PDA, and MS data of cyclohexenone derivatives from mycorrhizal roots of leek (*A. porrum*)

| Compound | HPLC- R (min) | PDAλ (nm) | ESI-MS (m/z) [[M + H]+ | [A + H]+[a] | Structural assignment |
|---|---|---|---|---|---|
| 1 | 9.8 | 225sh/243 | 551 | 227 | 13-Hydroxyblumenol C di-9,13-O-β-glucopyranoside |
| 2 | 13.1 | 225sh/245 | 389 | 227 | 13-Hydroxyblumenol C 9-O-β-glucopyranoside |
| 3 | 20.1 | 215sh/225sh/243 | 533 | 227 | 13-Hydroxyblumenol C 9-O-[3'-O-(3"-hydroxy-3"-methylglutaryl)-β-glucopyranoside] |
| 4 | 23.0 | 230sh/244 | 533 | 227 | 13-Hydroxyblumenol C derivative |
| 5 | 23.8 | 225sh/241 | 533 | 227 | Mixture of 13-hydroxyblumenol C and blumenol C derivatives |

TABLE 2-continued

Retention time, HPLC-PDA, and MS data of cyclohexenone derivatives from mycorrhizal roots of leek (*A. porrum*)

| Compound | R (min) | HPLC-PDAλ (nm) | ESI-MS (m/z) [[M + H]$^+$ | [A + H]$^{+a}$ | Structural assignment |
|---|---|---|---|---|---|
| 6 | 27.2 | 230sh/244 | 505 | 211 | Blumenol C 9-O-(6'-O-α-arabinopyranosyl-β-glucopyranoside) |
| 7 | 27.2 | 230sh/244 | 535 | 211 | Blumenol C 9-O-(4'-O-glucosyl-β-glucopyranoside) |
| 8 | 31.9 | 220sh/230sh/242 | 619 | 227 | 13-Hydroxyblumenol C 9-O-[3'-O-(3''-hydroxy-3''-methylglutaryl)-6'-O-malonyl-β-glucopyranoside] |
| 9 | 37.7 | 220sh/230sh/245 | 517 | 211 | Blumenol C 9-O-[3'-O-(3''-hydroxy-3''-methylglutaryl)-β-glucopyranoside] |
| 10 | 39.8 | 220sh/230sh/245 | 459 | 211 | Blumenol C 9-O-(6'-O-malonyl-β-glucopyranoside) |
| 11 | 51.0 | 230sh/245 | 517 | 211 | Isomer of 9 |

Compound numbers correspond to peak numbers in FIG. 1.
$^a$A: aglycone.

TABLE 3

Metabolites identified in ragwort roots that were significantly increased after colonisation by *Rhizophagus irregularis*

| Metabolite number[¶] | Observed ion (m/z) | UPLC-TOFMS r.t. | Putative formula | Theoretical mass of ion | Putative identity | Fold change$^a$ | P-value$^b$ |
|---|---|---|---|---|---|---|---|
| 1 | 389.2177 | 6.37 | $C_{19}H_{33}O_8$ | 389.2175 | 13-hydroxyblumenol C glycoside [M + H]$^+$ | 1151.2* | 6.65 × 10$^{-9}$ |
| 1 | 387.2018 | 6.37 | $C_{19}H_{31}O_8$ | 387.2018 | 3-hydroxyblumenol C glycoside [M + H]$^-$ | 746.6* | 6.65 × 10$^{-9}$ |
| 2 | 373.2228 | 7.23 | $C_{19}H_{33}O_7$ | 373.2226 | Blumeno C glycoside [M + H]$^+$ | 8065.8 | 6.65 × 10$^{-9}$ |
| 3 | 547.2389 | 7.30 | $C_{25}H_{39}O_{13}$ | 547.2391 | Blumenol C glycosyl-glucuronide [M + H]$^-$ | 1553.3 | 6.65 × 10$^{-9}$ |
| 4 | 475.2182 | 7.55 | $C_{22}H_{35}O_{11}$ | 475.2179 | 13-hydroxyblumenol C malonylglycoside [M + H]$^+$ | 489.7 | 2.29 × 10$^{-7}$ |
| 5 | 373.2222 | 8.20 | $C_{19}H_{33}O_7$ | 373.2226 | Blumenol C glycoside [M + H]$^+$ | 5032.0 | 6.65 × 10$^{-9}$ |
| 6 | 635.2551 | 8.24 | $C_{28}H_{43}O_{16}$ | 635.2551 | Blumenol C malonylglycosyl-glucuronide [M + H]$^+$ | 3101.3* | 6.65 × 10$^{-9}$ |
| 6 | 633.2396 | 8.24 | $C_{28}H_{41}O_{16}$ | 633.2395 | Blumenol C malonylglycosyl-glucuronide [M + H]$^-$ | 250.4* | 6.65 × 10$^{-9}$ |
| 7 | 459.2232 | 9.38 | $C_{22}H_{35}O_{10}$ | 459.2230 | Blumenol C malonylglycoside [M + H]$^+$ | 1109.2 | 6.65 × 10$^{-9}$ |
| 8 | 494.3247 | 14.20 | $C_{24}H_{49}NO_7P$ | 494.3247 | Hexadecenoyl-glycero-phosphocholine [M + H]$^+$ | 7.86 | 2.00 × 10$^{-7c}$ |

Figure 2:
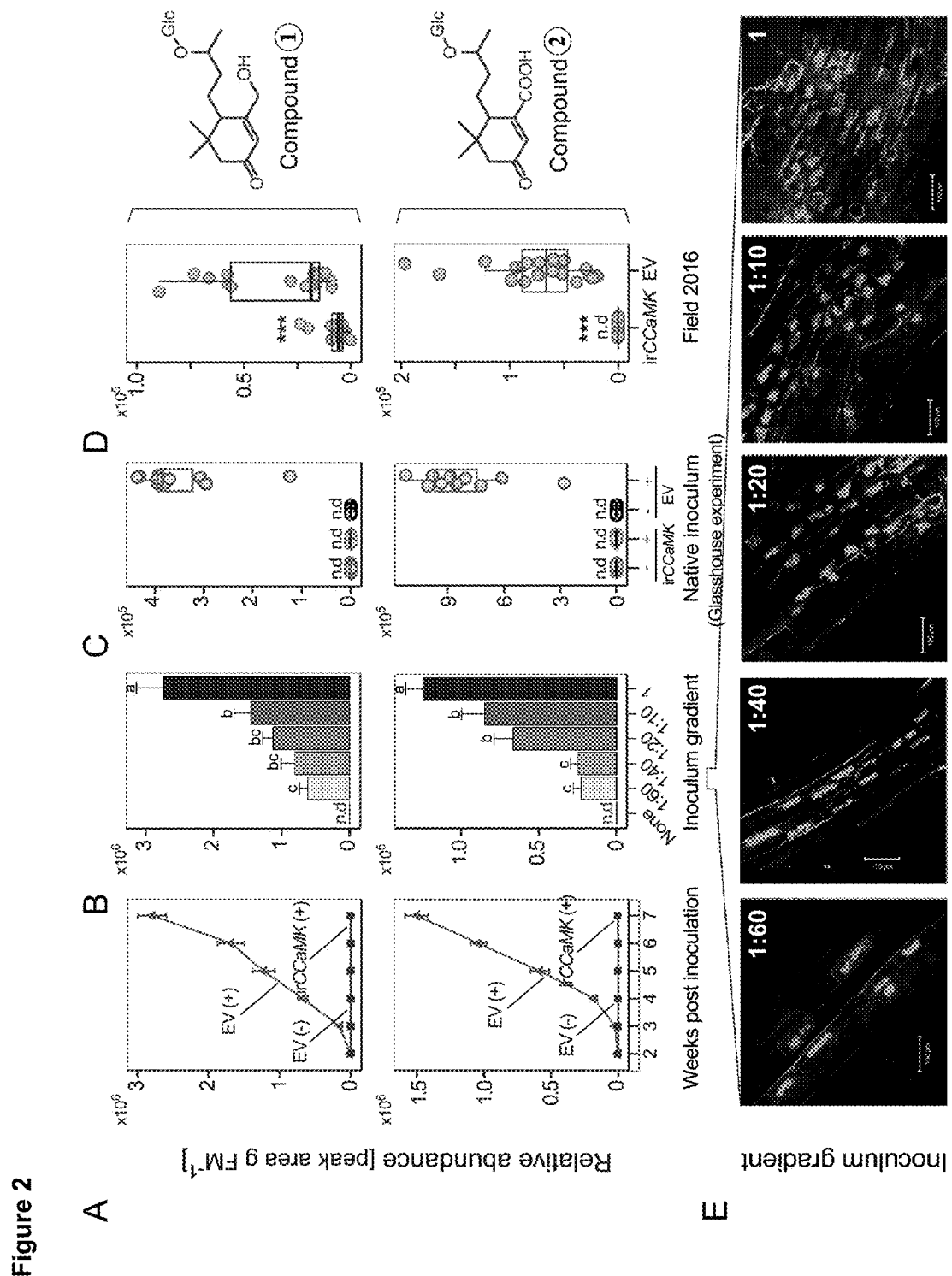
Figure 2:
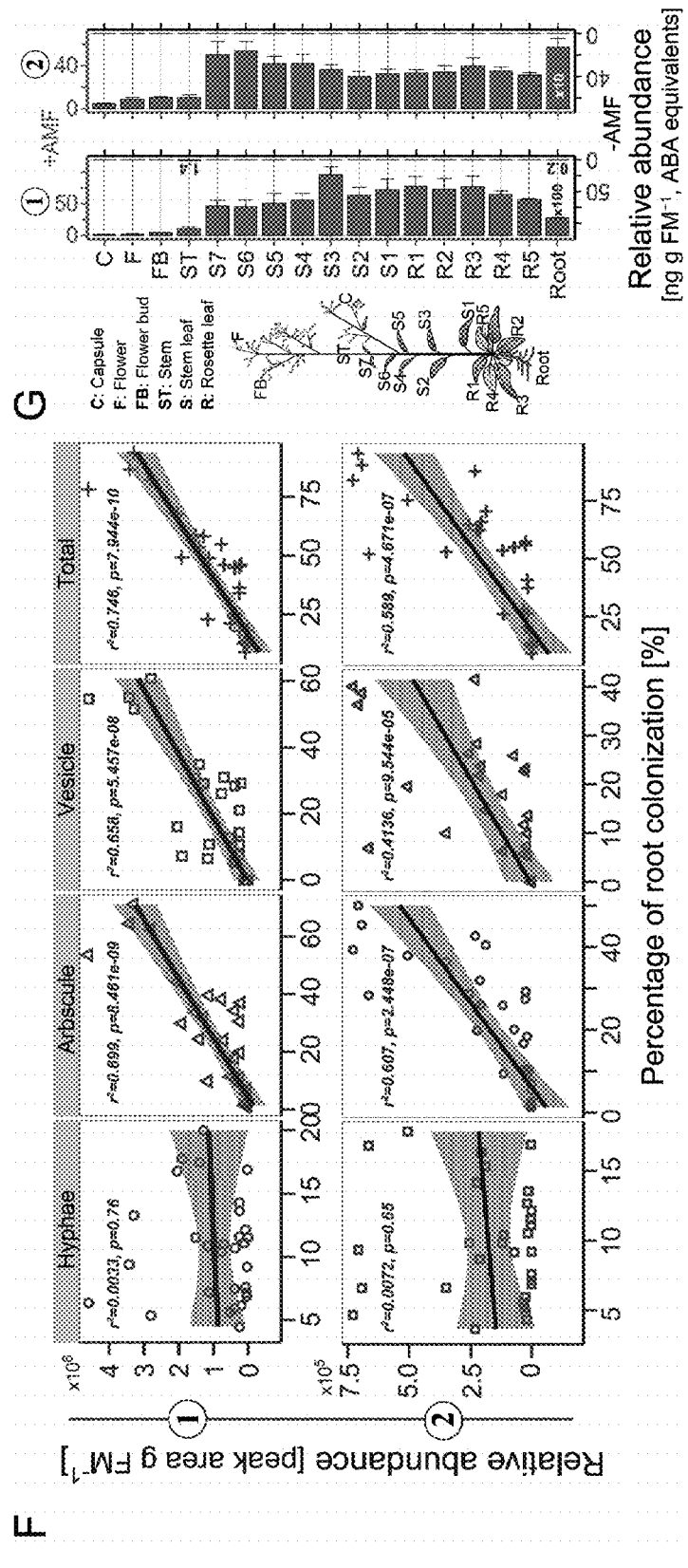

[¶]Structures given in FIG. 2
r.t. = retention time
$^a$Fold change indicates the concentration increase in roots colonised with AMF when compared to the concentrations observed in control plants
$^b$Significance determined using t-tests ($^c$) or Mann-Whitney U tests (unmarked) after Bonferroni adjustments
*Differences in estimation of fold change between [M + H]$^+$ and [M − H]$^-$ signals for the same metabolite were due to presence of a Na adduct competing with the [M + H]$^+$ ion in positive ESI mode Especially preferred blumenols are 11-hydroxy-blumenol C 9-O-Glc, 11-carboxy blumenol C 9-O-Glc, blumenol B 9-O-glucoside, blumenol C 9-O-glucoside, hydroxyblumenol C diglycoside (containing a hexose and a pentose), blumenol C 9-O-glucoside-glucuronide, 11-hydroxyblumenol C 9-O-glucoside-rhamnoside, and blumenol C 9-O-glucoside-rhamnoside.

Generally speaking, more than one of the above preferred blumenols may be found to correlate with mycorrhizal colonization in a given plant. Nevertheless, in several instances particularly preferred blumenols have been found as markers of mycorrhizal association in specific plants. These are given below.

*Nicotiana attenuata*: 11-carboxyblumenol C 9-O-glucoside, 11-hydroxyblumenol C 9-O-glucoside; *Solanum tuberosum*: 11-carboxyblumenol C 9-O-glucoside; *Solanum lycopersicum*: 11-carboxyblumenol C 9-O-glucoside; *Brachypodium distachyon*: 11-carboxyblumenol C 9-O-glucoside, blumenol B 9-O-glucoside, blumenol C 9-O-glucoside; *Medicago truncatula*: hydroxyblumenol C diglycoside (containing a hexose and a pentose), blumenol B 9-O-glucoside; *Triticum aestivum*: 11-carboxyblumenol C 9-O-glucoside, 11-hydroxyblumenol C 9-O-glucoside, blumenol C 9-O-glucoside-glucuronide; *Hordeum vulgare*: 11-carboxyblumenol C 9-O-glucoside, 11-hydroxyblumenol C 9-O-glucoside, 11-hydroxyblumenol C 9-O-glucoside-rhamnoside, blumenol C 9-O-glucoside-rhamnoside; *Oryza sativa*: 11-hydroxyblumenol C 9-O-glucoside, 11-carboxyblumenol C 9-O-glucoside.

In a further preferred embodiment, said AMF is a fungus of the phylum Glomeromycota, and is preferably selected from *Rhizophagus irregularis, Funneliformis mosseae, Glomus versiforme, Acaulospora* sp., *Archaeospora* sp., *Claroideoglomus etunicatum, Dentiscutata heterogama, Gigaspora albida* and *Gigaspora gigantea*.

Further information about AMFs, in particular fungi of the phylum Glomeromycota, can be found in the MaarjAM database, which database is described in the publication Öpik et al. ((2010) The online database MaarjAM reveals global and ecosystemic distribution patterns in arbuscular mycorrhizal fungi (Glomeromycota). *New Phytologist* 188, 223-241).

In a further preferred embodiment, (i) said second plant is free of any association with an AMF; (ii) said second plant has an association with an AMF; (iii) said first and said second plant are the same individual at different points in time; (iv) said method comprises determining the amount of said blumenol in said first plant; (v) said method comprises determining the amount of said blumenol in said second plant; and/or (vi) said comparing is effected in a computer-implemented manner.

Item (i) of the above preferred embodiment defines a preferred baseline value for the method of the first aspect which allows to determine presence or absence (at least below a determined threshold which is the threshold of detection of the analytical method being used) of a AMF association in the first plant.

Item (ii) relates to a different preferred baseline value, namely where the second plant does have an association with an AMF. Also such type of comparison is of practical value, especially when it comes to optimization of plant-AMF associations. For example, said second plant may be associated with a specific AMF which is commonly present or generally used, e.g. by breeders or in the field of agriculture. For the purpose of testing, a new type of AMF may be brought into contact with the first plant (belonging preferably to the same species, subspecies, variety, subvariety, form or subform as the second plant) and, after sufficient time has elapsed for the formation of a functional association, the level of a blumenol in said first plant may be determined and compared to that of said second plant. If the new type of AMF gives rise to higher blumenol levels, said new type of AMF is a candidate for replacing the established AMF or providing the new type of AMF in addition. Such replacement can be done with the aim of improved resource acquisition, improved stress resistance and/or, under certain circumstances, improved yield of said plant. For further details of such uses of the invention, we refer to further aspects of the invention disclosed below.

Item (iii) refers to those preferred embodiments where the same individual plant is used to define the baseline value.

It is understood that the method in accordance with the first aspect may be applied repeatedly. In other words, time series may be recorded, wherein the time series is indicative of the degree of association over time. In other words, the invention permits monitoring of the mycorrhization status of plants.

Items (iv) and (v) make the actual determination of the blumenol level in first and/or second plant compulsory. Preferred means of determination are given below.

Item (vi) relates to the computer implementation of the method of the first aspect. Basically, regardless of whether items (iv) and/or (v) are combined with item (vi) or not, the method may be computer-implemented. To the extent the amounts in both first and second plant are taken from documents, publications or databases, preference is given to item (vi).

To the extent technically meaningful, two or more of items (i) to (vi) may be combined with each other. Preferred combinations are the combination of item (i) with item (iv) as well as the combination of item (ii) with item (iv). In either case, preferably item (vi) may be added to these particularly preferred combinations. Also in either case, and also in conjunction with item (vi), the amount in said second plant is preferably taken from a knowledge base such as publication or database.

In a further preferred embodiment, said determining the amount of said blumenol is affected by an analytical method selected from mass spectrometry, spectroscopy and antibody-based methods.

In the field of mass spectrometry, particular preference is given to quadrupole mass spectrometry, time-of-flight mass spectrometry, ion-trap mass spectrometry, sector field mass spectrometry as well as combinations thereof. In the field of spectroscopy, preference is given to UV absorption spectroscopy, Raman spectroscopy as well as light scattering spectroscopy. Preferred antibody-based methods include enzyme-linked immunosorbent assays (ELISA).

Especially preferred is mass spectrometry. We note that the present inventors employed mass spectrometry not only for purposes of the method in accordance with the first aspect, but furthermore for establishing that blumenols are suitable markers.

For the sake of completeness, we note that in the course of mass spectrometry analysis, not only blumenols as such, but also adducts and/or breakdown products thereof may be detected and quantified.

In a particularly preferred embodiment, prior to said analytical method, a sample taken from said aerial part is extracted, concentrated, and/or purified.

A preferred method of extraction is extraction with methanol, ethanol, iso-propanol, acetonitrile, acetone, ethyl acetate, chloroform, pyridine, mixtures thereof, as well as mixtures of one or more of these solvents with water, preferably 80% methanol with 20% water.

A preferred method of purification is chromatography such as liquid chromatography (LC) and solid phase extraction (SPE). Chromatography may be coupled to mass spectrometry (MS), preferably online such as online LC/MS.

In a second aspect, and related to the first aspect, the present invention provides the use of a blumenol as a marker for association of a plant with an AMF.

Preferred embodiments of the first aspect define mutatis mutandis preferred embodiments of the second aspect. Just to give an example, preferred blumenols are those of formulae (I) and (II) as disclosed herein above. Similarly, preferred aerial parts are those disclosed above. Also, preferred plants and preferred AMFs, respectively, are those disclosed above.

Generally speaking, preferred embodiments of the first aspect define mutatis mutandis preferred embodiments of all further aspects of the invention.

In a third aspect, the present invention relates to a method of determining whether a plant has AMF receptivity, improved resource acquisition, or improved stress resistance;
    or of quantifying said receptivity, said improved acquisition, or said improved resistance;
    said method comprising:
    (a) contacting said plant with an AMF known to be capable of colonization; and
    (b) comparing an amount of a blumenol and a reference to obtain a difference between said amount and said reference;
    wherein said amount is the quantity in an aerial part of said plant at or after a second point in time which is the earliest point in time after said contacting where said association has formed or would have formed; and
    said reference is the quantity of said blumenol in an aerial part (i) of said plant prior to a first point in time which is the earliest point in time where an association may form; or (ii) of a second plant which is free of any association with an AMF;

wherein a higher amount as compared to said reference is indicative of said receptivity, said improved acquisition, or said improved resistance; and said difference is a measure of said receptivity, and/or of the improvement of said acquisition or of said resistance.

The method of the third aspect relates to assessing the response behavior of a given plant to contacting with an AMF. The response behavior may be AMF receptivity, i.e., the capability of the plant to establish an association. Establishing an association entails benefits for the plant, which benefits include improved resource acquisition as well as improved stress resistance. Resources include phosphorous. Further preferred resources are detailed below.

For the purpose of the method in accordance with the third aspect, an AMF is to be used which is known to be capable of colonization. Whether an AMF is capable of colonization is either previously known or may be determined, for example with the method of determining whether an AMF has colonization capability in accordance with the present invention (disclosed further below) or, as done in the prior art, by bringing a candidate AMF into contact with the plant which is capable of establishing an association and subsequently analyzing the roots of such plant.

Related to the first aspect of the invention, also the method of the third aspect may be used in a qualitative (in case of the third aspect referred to as "determining") and a quantitative ("quantifying") manner.

Said contacting could be done for example by transferring the plant to a AMF containing soil (e.g., mixed before with a commercial inoculum), by watering with a AMF containing solution (e.g., spore solution), adding a nurse plant (AMF infected plant) to the soil, placing isolated spores onto roots, or by adding another AMF containing medium to the soil (e.g. a AMF containing piece of agar, AMF containing root pieces).

The difference to be determined in accordance with step (b) of the method of the third aspect is defined as follows: amount minus reference.

It is understood that the terms "amount", "reference" and "quantity" all refer to the same physical property, said property preferably being concentration, mass or amount of substance (see further above). Additionally, relative measures of mass, amount of substance and concentration are considered if they are established in the art as direct proxies (e.g., signal intensity of the used detection system).

The method of the third aspect introduces the notion of two time points. The first point in time is associated with the reference state. Preferably, and this is disclosed further below, said first point in time is prior to performing the step (a) of contacting. However, and noting that the developing of a functional association takes time, said first point in time may also be later, namely after said contacting in accordance with step (a), but prior to that particular point in time where a functional association may have formed. Typical time spans when functional associations are detected are between two and ten weeks, for strong interactions preferably between six and eight weeks. Eight weeks is generally a time span where an association has formed for most relevant pairs of plants with AMFs.

First signs of functional associations might occur after a few days; e.g., Alexander et al. ((1985) A developmental study of the early stages in vesicular-arbuscular mycorrhiza formation. *Canadian Journal of Botany* 63 184-194) found the formation of first arbuscules between the third and fourth day after contacting. The development of the association might vary depending on the particular used plant, AMF, type of inoculation and the environmental parameters (e.g., temperature, fertilization, soil nutrient content).

Accordingly, said second point in time is to be chosen such that the association has formed (or would have formed). The alternative expressed by the phrase "would have formed" relates to those cases where sufficient time has elapsed for an association to form but none has been formed, for example because the plant being tested has no AMF receptivity.

Preferred blumenols are those defined further above.

Preferred aerial parts are those defined further above. Particularly preferred are leaves.

The method of the third aspect provides two alternatives for the reference. Either the same plant at an earlier point in time may be used as a reference, or a second plant, preferably of the same species, which is free of any association with an AMF.

Similar as with the method of the first aspect, the reference value may be taken from a knowledge base such as a publication or a database.

As noted above, the methods of the present invention are particularly amenable to high throughput.

As such, the present invention provides, in a fourth aspect, a method of screening plants for AMF receptivity, improved resource acquisition, or improved stress resistance;

said method comprising (a) applying the method of the third aspect to a plurality of plants;

or (b) (i) contacting each of a plurality of plants with an AMF known to be capable of colonization; and (ii) determining the amount of a blumenol in an aerial part of each plant after a point in time which is the earliest point in time where said association has formed or would have formed;

wherein said plants belong to the same species;

wherein the higher the amount of said blumenol, the higher is said receptivity, said resource acquisition, or said stress resistance.

The term "plurality" as used herein refers to two, three, four, five, ten, twenty, hundred or more, in the present case plants.

Alternative (a) of the method of the fourth aspect provides for the repeated use of the method of the third aspect. As is evident from the description of the method of the third aspect, this requires a reference value in each case.

Reference values for each comparison, however, are dispensable in those instances where several plants belonging to the same species are assessed. This is the subject of alternative (b) of the method of the fourth aspect. Here a plurality of plants of the same species is assessed, the observed amounts may e.g. be sorted and the plant with the highest amount of blumenol is the plant with the highest receptivity for AMF, the highest resource acquisition and/or the highest stress resistance. It is understood that "higher" and "highest", in their broadest sense, are relative terms. Yet, they provide for practical uses such as ranking of plants and/or of AMFs.

Figure 4:
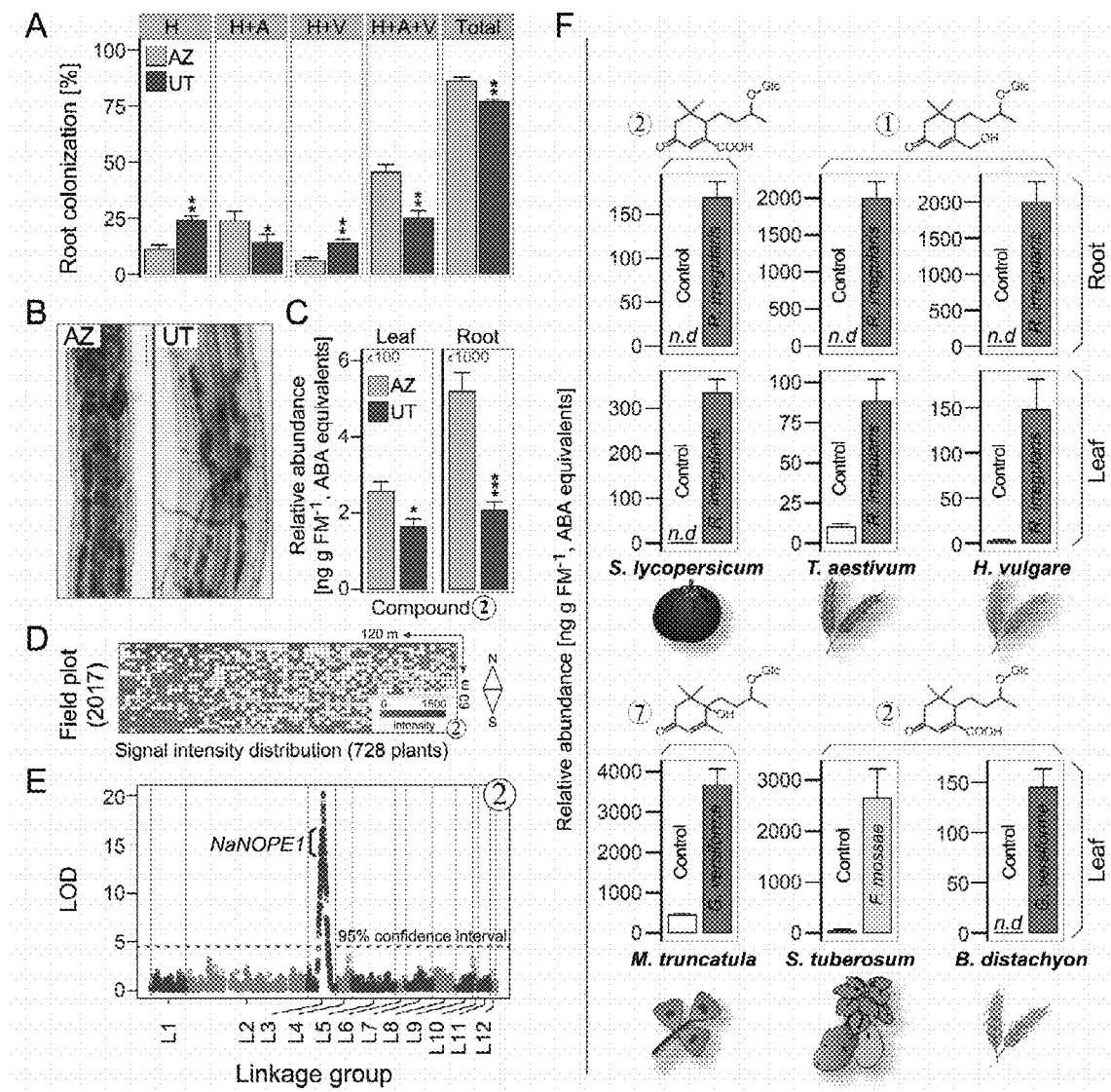

Additionally, quantitative information might be used for forward genetics approaches, e.g., quantitative trait loci (QTL) mapping to find the genetic regions associated with the receptivity of a plant; see, e.g. FIG. 4.

For the purpose of the present invention, a "higher degree of receptivity" and a "higher degree of association" is characterized by a higher potential for exchange of metabolites between plant and AMF.

In a fifth aspect, the present invention provides a method of screening plants for improved resource acquisition or improved stress resistance, said method comprising comparing the amounts of a blumenol in an aerial part of a plurality of plants, wherein said plants belong to the same species, and wherein the higher the amount of said blumenol, the higher is said resource acquisition or said stress resistance.

Generally speaking, the term "plurality" as used herein refers to two, three, four, five, ten, twenty, hundred or more, in the present case plants.

Compared with the method of the fourth aspect, the method of the fifth aspect dispenses with the requirement for a step of contacting. While contacting is not excluded from the method of the fifth aspect, the method of the fifth aspect may also be practiced by using values taken from e.g. documents, publications or databases.

In preferred embodiments of the method of the third, fourth and fifth aspect, said methods further comprise selecting the plant(s) with the highest amount(s) or (a) predefined amount(s) of said blumenol, or the plant(s) with the highest difference(s) or (a) predefined difference(s), respectively.

With regard to predefined differences, it is of note that, depending on the growth conditions, the plant species and involved AMFs, the costs for maintaining the AM might outweigh the benefits. Therefore, sometimes lower receptivity might be advantageous.

The above methods of the third, fourth and fifth aspect relate to testing a plant or plurality of plants. In analogy thereto, the present invention also provides methods of testing an AMF or a plurality of AMFs.

Accordingly, the present invention, in a sixth aspect, provides a method of determining whether an AMF has colonization capability, capability of supplying a resource to a plant, or of providing stress resistance to said plant; or of quantifying said capability/ies; said method comprising:
  (a) contacting said AMF with a plant known to be receptive for colonization; and
  (b) comparing an amount of a blumenol and a reference to obtain a difference between said amount and said reference;
  wherein said amount is the quantity in an aerial part of said plant at or after a second point in time which is the earliest point in time after said contacting where said association has formed or would have formed; and
  said reference is the quantity of said blumenol in an aerial part
    (i) of said plant prior to a first point in time which is the earliest point in time where an association may form; or
    (ii) of a second plant which is free of any association with an AMF;
  wherein a higher amount as compared to said reference is indicative of said capability/ies and said difference is a measure of said capability/ies.

The method of the sixth aspect is the counterpart of the method of the third aspect. While the method of the third aspect is designed for the purpose of testing plants, the method of the sixth aspect is for testing AMFs. Properties to be tested are colonization capability and, noting that colonization provides benefits to the plant, the capability of supplying a resource to a plant as well as the capability of providing stress resistance to a plant.

In a seventh aspect, the present invention provides a method of screening AMFs for colonization capability, capability of supplying a resource to a plant or of providing stress resistance to said plant, said method comprising
  (a) applying the method of the sixth aspect to a plurality of AMFs;
  or
  (b) (i) contacting each of a plurality of AMFs with a plant known to be receptive for colonization; and
      (ii) determining the amount of a blumenol in an aerial part of each plant after a point in time which is the earliest point in time where said association has formed or would have formed;
      wherein said plants belong to the same species; wherein the higher the amount of said blumenol, the higher is/are said capability/ies.

Explanations relating to the methods of the fourth aspect apply mutatis mutandis to the method of the seventh aspect.

In an eighth aspect, the present invention provides a method of screening AMFs for the capability of supplying a resource to a plant or of providing stress resistance to said plant, said method comprising comparing the amounts of a blumenol in an aerial part of individuals of said plant, which individuals are associated with an AMF, wherein the higher the amount of said blumenol, the higher is/are said capability/ies.

The method of the eighth aspect is the counterpart of the method of the fifth aspect.

In preferred embodiments of the methods of the sixth, seventh and eighth aspect, said methods further comprise selecting the AMF(s) giving rise to the highest amount(s) or (a) predefined amount(s) of said blumenol, or the AMF(s) giving rise to the highest difference(s) or (a) predefined difference(s), respectively.

In a further preferred embodiment, (a) said resource is selected from phosphorus, nitrogen and water; or (b) said stress is selected from drought, heavy metal exposure, pathogen infection and herbivore infestation.

In many instances, optimizing associations between plants and AMFs is also a means of optimizing yield of the plants. Especially under conditions where resources such as phosphorous are not abundant or scarce, the plant will significantly benefit from the association, not only in terms of resource acquisition and stress resistance, but also in terms of yield. In other words, the above disclosed methods of the third, fourth, fifth, sixth, seventh and eighth aspect may also be employed to determine whether a plant has (or will have) improved yield (methods of third, fourth and fifth aspect), and whether an AMF has a capability of improving yield of plants (method of sixth, seventh and eighth aspect of the invention). Preferably, said improved yield occurs or is expected to occur under conditions where resources such as phosphorous are not abundant or scarce.

Related thereto, it is expected that the mycorrhization status of plants has an influence on flavor of the plant and parts thereof including aerial parts. As a consequence, methods and uses of the invention may also be employed to modulate or optimize flavor of plants.

Generally speaking, the production of associations comprising a plant and an associated AMF is desirable in the field of breeding and agriculture. Generating such associations, in particular associations of higher degree or desired degree is facilitated by the present invention, given that blumenol levels in aerial parts of plants are amenable to easy and convenient determination.

In line with the above considerations, the present invention accordingly provides, in a ninth aspect, a method of producing an association of a plant with an AMF, said method comprising:

(a) (i) contacting said plant with an AMF;
   (ii) comparing an amount of a blumenol and a reference to obtain a difference between said amount and said reference;
      wherein said amount is the quantity in an aerial part of said plant at or after a second point in time which is the earliest point in time after said contacting where said association has formed or would have formed; and said reference is the quantity of said blumenol in an aerial part
         (1) of said plant prior to a first point in time which is the earliest point in time where an association may form; or
         (2) of a second plant which is free of any association with an AMF; and
   (iii) obtaining said association if said amount is increased as compared to said reference or about equal to a predefined amount of said blumenol;
(b) (i) contacting said plant with each of a plurality of AMFs;
   (ii) determining in each case the amount of a blumenol in an aerial part of said plant after a point in time which is the earliest point in time where said association has formed or would have formed; and
   (iii) selecting the association which has the highest amount or a predefined amount of said blumenol;
or
(c) (i) contacting a plurality of plants with an AMF;
   (ii) determining the amount of a blumenol in an aerial part of each plant after a point in time which is the earliest point in time where said association has formed or would have formed; and
   (iii) selecting the association which has the highest amount or a predefined amount of said blumenol.

Items (a), (b) and (c) each define a separate method of producing an association.

In preferred embodiments of the methods of the third, fourth, fifth, sixth, seventh, eighth and ninth aspect, (i) said first point in time is prior to said contacting; (ii) said plant(s), prior to said contacting or prior to said first point in time, is/are free of said association; (iii) said method comprises determining the amount of blumenol at or before said first point in time; (iv) said method comprises determining the amount of blumenol at or after said second point in time; and/or (v) said comparing is effected in a computer-implemented manner.

To the extent this is technically meaningful, two or more of items (i) to (v) may be combined.

Preferred are the combinations: (i), (ii) and (iv), wherein preferably the amount at said first point in time is taken from a knowledge base; and (i) and (iv), wherein preferably said plant(s), prior to said contacting or prior to said first point in time, has/have an association. The (additional) use of item (v) is also preferred.

The AMF to be used for contacting with a given plant is preferably provided as (i) a single AMF; (ii) a mixture of AMFs; (iii) a spore isolate of roots or soil of a mycorrhized plant; and/or (iv) unsterile soil. In case of (iv) the soil was preferentially inhabited by plants with AMF before. The species of said plants is not particularly limited.

In a tenth aspect, the present invention provides an association of a plant with an AMF obtained by the method of the ninth aspect.

In an eleventh aspect, the present invention provides a mass spectrometer configured for the quantitative analysis of a blumenol of formula (I) or formula (II) as defined herein above. Said spectrometer may be equipped with a computer program that identifies and quantifies blumenols of the present invention by analysing parent, adduct and fragment ions that are formed from blumenols in the course of mass spectrometric analysis.

In a twelfth aspect, the present invention provides an antibody specific for a blumenol of formula (I) or (II).

In a thirteenth aspect, the present invention provides a kit comprising or consisting of one, more or all of the following: (a) a vial containing a solvent suitable for extracting blumenol from an aerial part of a plant, said solvent preferably being methanol, ethanol, iso-propanol, acetonitrile, acetone, ethyl acetate, chloroform, pyridine, mixtures thereof as well as mixtures of one or more of these solvents with water; (b) the antibody of the twelfth aspect; (c) an enzyme being linked to said antibody or to a secondary antibody directed against the antibody of the twelfth aspect; (d) a substrate of said enzyme; (e) the mass spectrometer of the eleventh aspect; and/or (f) a manual for performing the method of any one of the preceding claims.

Preferred kits comprise or consist of (b) and (c); (a), (e) and (f); or (a), (b), (c), (d) and (f).

As regards the embodiments characterized in this specification, in particular in the claims, it is intended that each embodiment mentioned in a dependent claim is combined with each embodiment of each claim (independent or dependent) said dependent claim depends from. For example, in case of an independent claim 1 reciting 3 alternatives A, B and C, a dependent claim 2 reciting 3 alternatives D, E and F and a claim 3 depending from claims 1 and 2 and reciting 3 alternatives G, H and I, it is to be understood that the specification unambiguously discloses embodiments corresponding to combinations A, D, G; A, D, H; A, D, I; A, E, G; A, E, H; A, E, I; A, F, G; A, F, H; A, F, I; B, D, G; B, D, H; B, D, I; B, E, G; B, E, H; B, E, I; B, F, G; B, F, H; B, F, I; C, D, G; C, D, H; C, D, I; C, E, G; C, E, H; C, E, I; C, F, G; C, F, H; C, F, I, unless specifically mentioned otherwise.

Similarly, and also in those cases where independent and/or dependent claims do not recite alternatives, it is understood that if dependent claims refer back to a plurality of preceding claims, any combination of subject-matter covered thereby is considered to be explicitly disclosed. For example, in case of an independent claim 1, a dependent claim 2 referring back to claim 1, and a dependent claim 3 referring back to both claims 2 and 1, it follows that the combination of the subject-matter of claims 3 and 1 is clearly and unambiguously disclosed as is the combination of the subject-matter of claims 3, 2 and 1. In case a further dependent claim 4 is present which refers to any one of claims 1 to 3, it follows that the combination of the subject-matter of claims 4 and 1, of claims 4, 2 and 1, of claims 4, 3 and 1, as well as of claims 4, 3, 2 and 1 is clearly and unambiguously disclosed.

The figures show:

FIG. 1 Combined targeted and untargeted metabolomics identified blumenol derivatives as AMF-indicative in-planta fingerprints in the roots and leaves of *Nicotiana attenuata* plants.

A Experimental set-up. EV and irCCaMK plants were co-cultured and inoculated with or without *Rhizophagus irregularis*. Six weeks after inoculation (wpi), root samples were harvested for metabolite profiling. B Covariance network visualizing m/z features from UHPLC-qTOF-MS untargeted analysis (n=8). Known compounds, including nicotine, phenylalanine and various phenolics, and unknowns (Unk.) are annotated by dashed ellipses. C Normalized Z-scored m/z features were clustered using STEM Clustering; 5 of 8 significant clusters are shown in different grey levels and mapped onto the covariance network. The intensity variation (mean+SE) of 2 selected features (Compounds 1 and 2) are shown in bar plots (n.d, not detected). D Representative chromatograms of Compounds 1 and 2 in roots and leaves of plants with and without AMF inoculation, as analyzed by targeted UHPLC-triple quadrupole-MS metabolomics.

FIG. 2 Compounds 1 and 2 are leaf markers of root AMF colonization in N. attenuata.

A Time lapse accumulations of Compounds 1 and 2 in leaves of EV plants with (EV+) or without (EV−) AMF inoculation and of irCCaMK plants with AMF inoculation (irCCaMK+)(means±SE, n≥6). B Leaf abundances of Compounds 1 and 2 (5 wpi) of plants inoculated with different inoculum concentrations (means+SE, n=8); different letters indicate significant differences (p<0.05, one-way ANOVA followed by Fisher's LSD). C Compounds 1 and 2 in leaf samples of EV and irCCaMK plants inoculated with (+) or without (−) AMF inoculum isolated from the plant's native habitat (6 wpi); different letters indicate significant differences (p<0.05, one-way ANOVA followed by Tukey's HSD, n=10). D Field experiment (Great Basin Desert, Utah, USA): Compounds 1 and 2 in leaf samples of EV (n=20) and irCCaMK (n=19) plants sampled 8 weeks after planting. (Student's t-test: ***, p<0.001). E Representative images of WGA-488 stained roots of plants shown in B (bar=100 µm). F Leaf Compounds 1 and 2 relative to the percentage of root colonization by hyphae, arbuscules, vesicles and total root length colonization of the same plants (linear regression model). G Compounds 1 and 2 in 17 different tissues of plants with (+AMF, n=3, left aligned bars) or without (−AMF, n=1, right aligned bars) AMF inoculation harvested at 6 wpi.

Figure 3:
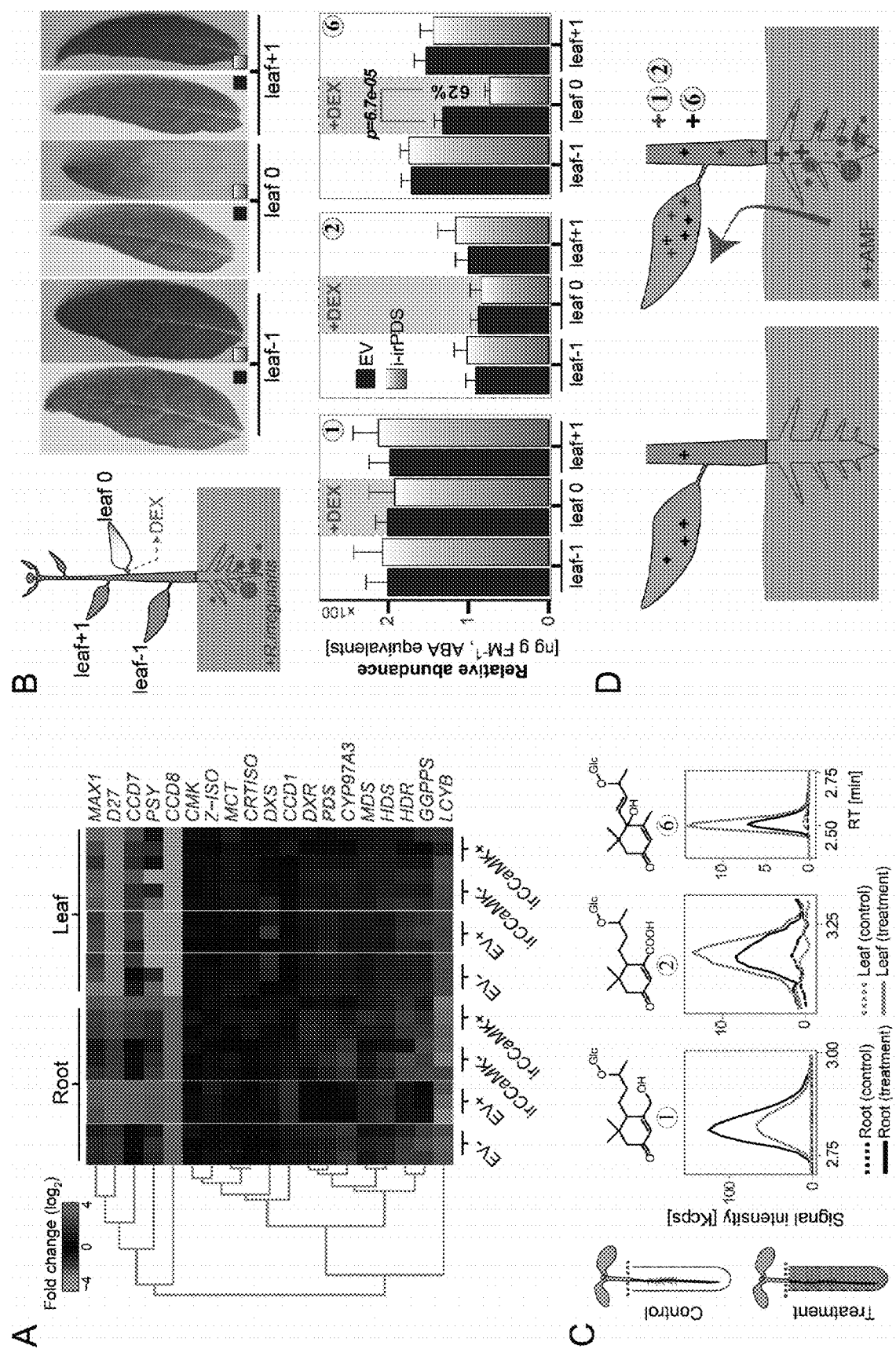

FIG. 3 The AMF-indicative accumulations of Compounds 1 and 2 in shoots originate from roots.

A Hierarchical clustering analysis of transcript abundance from RNA-seq of methylerythritol 4-phosphate (MEP) and (apo)carotenoid biosynthetic genes. B Compounds 1, 2 and 6 (not AMF-specific) in AMF-inoculated i-irPDS and EV plants. On each plant a single stem leaf (leaf 0) was elicited with 100 µM DEX-containing paste for 3 weeks; treated and adjacent, untreated control leaves (leaf −1 and leaf +1) were harvested. Representative leaves are shown (bleaching indicates PDS silencing); (means+SE, n=9). The same leaf positions in i-irPDS and EV plants were compared by Student's t-tests. C Contents of Compounds 1, 2 and 6 in the roots and shoots of seedlings whose roots were dipped for 1 d into an aqueous solution with or without AMF-indicative blumenols. D Model of the blumenol distribution in plants with (right panel) and without (left panel) AMF colonization. The model illustrates constitutive blumenols (e.g., Compound 6 in N. attenuata) and AMF-indicative ones (e.g., Compounds 1 and 2 in N. attenuata) and their inferred transport.

FIG. 4 AMF-indicative changes in blumenols in aerial plant parts are valuable research tools providing accurate assessments of functional AMF associations in high-throughput screenings of multiple plant and AMF species.

A Root colonization analysis between two N. attenuata accessions (UT/AZ). H: hyphae; A: arbuscules; V: vesicles; T: total colonization (n=8; Student's t-test, *, p<0.05, , p<0.01, *, p<0.001). B Representative images of trypan blue stained roots (6 wpi; bar=100 µm). C Compound 2 in roots and leaves of UT and AZ plants with and without AMF-inoculation (means+SE, n=8). D Heatmap of the normalized abundance of foliar Compound 2 of plants from a UT-AZ RIL population (728 plants) across a 7,200 m² field plot. E QTL mapping analysis of the data from D. QTL locus on linkage group 3 contains NaNOPE1, an AMF-associated gene, in addition to others. LOD, logarithm of the odds ratio. F Blumenol contents of different crop plants with and without AMF inoculation. Different plant and AMF species were used as indicated (means+SE; n.d, not detected).

Figure 5:
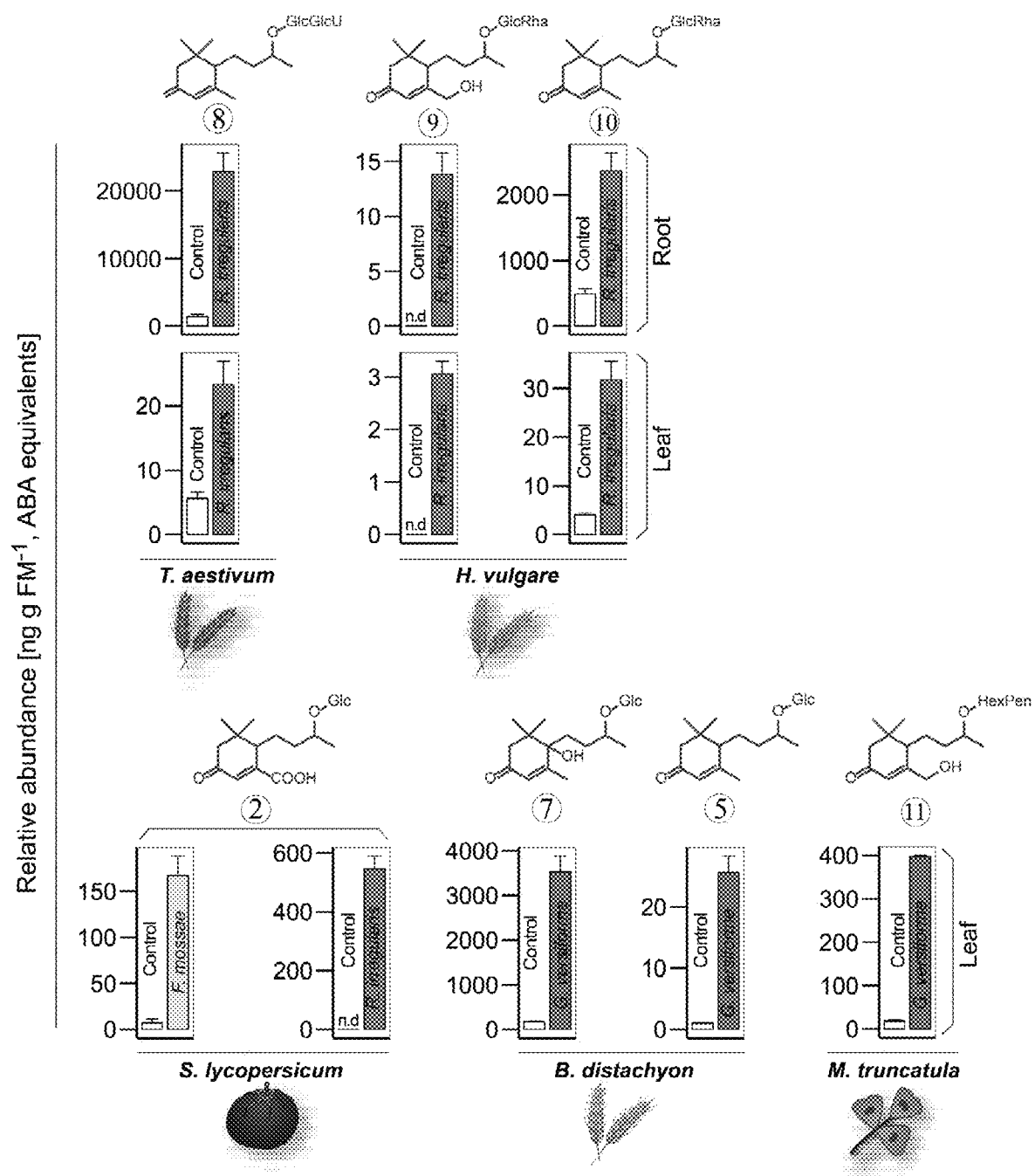

FIG. 5 AMF-indicative changes in blumenols in aerial plant parts are valuable research tools providing accurate assessments of functional AMF associations of multiple plant and AMF species (continued from FIG. 4F).

Blumenol contents of different crop plants with and without AMF inoculation. Different plant and AMF species were used, as indicated; means+SE, n.d, not detected.

Figure 6:
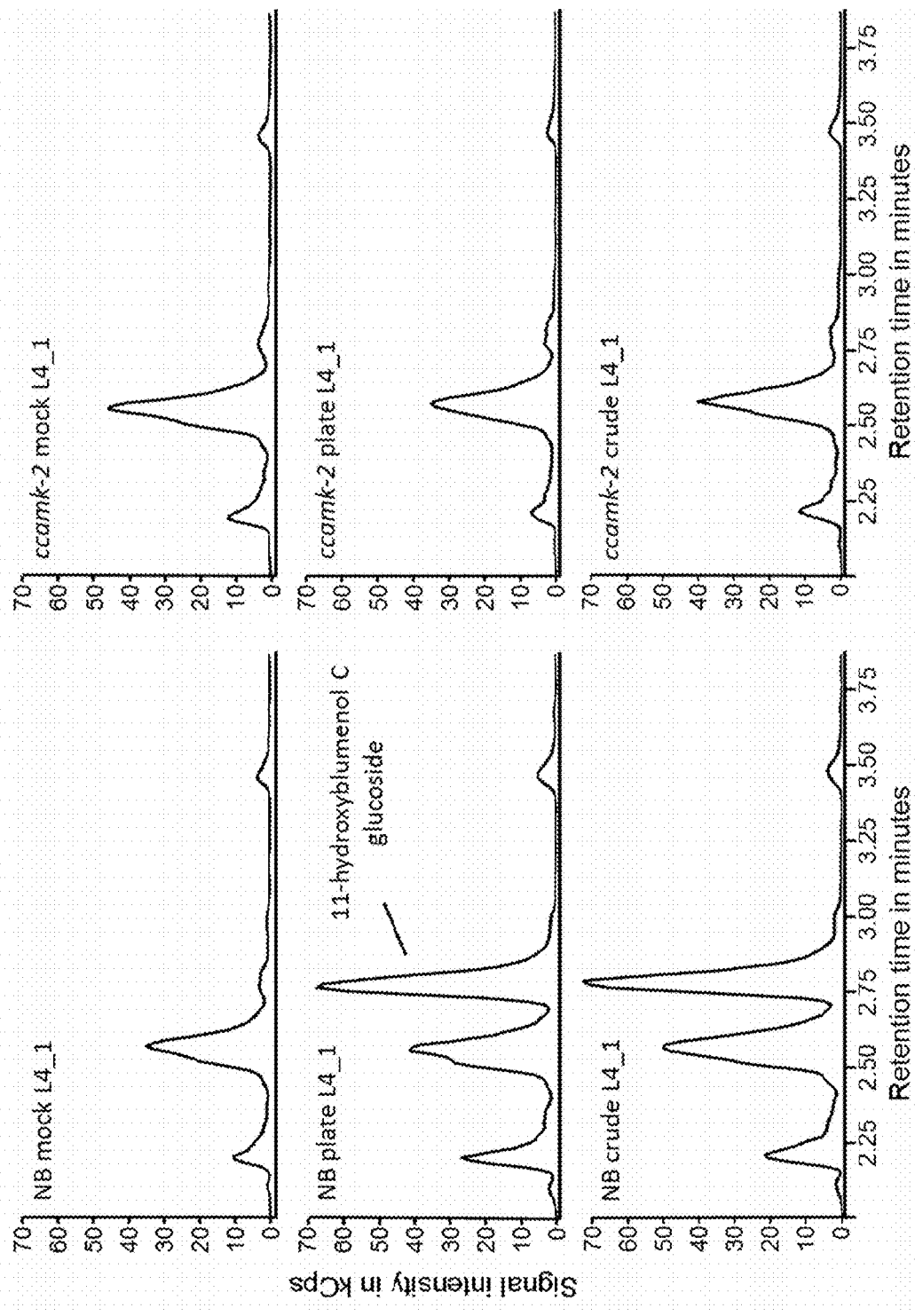

FIG. 6 Comparison of 11-hydroxyblumenol C glucoside (Compound 1) signals in wild-type Nipponbare (NB) and ccamk-2 mutant plants without (mock) or with inoculation with crude or pure-culture (plate) Rhizophagus irregularis inoculum.

Figure 7:
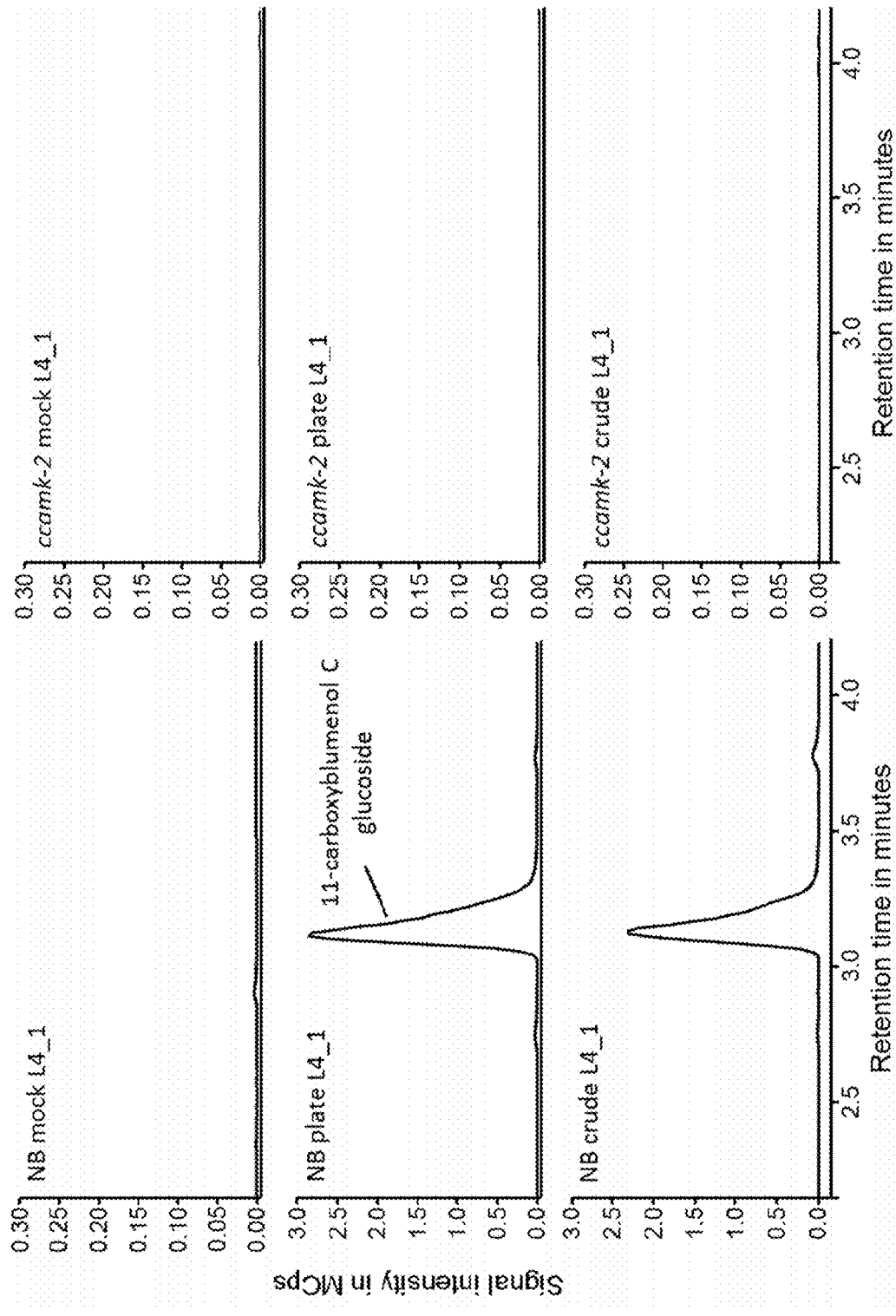

FIG. 7 Comparison of 11-carboxyblumenol C glucoside (Compound 2) signals in wild-type Nipponbare (NB) and ccamk-2 mutant plants without (mock) or with inoculation with crude or pure-culture (plate) Rhizophagus irregularis inoculum.

Figure 8:
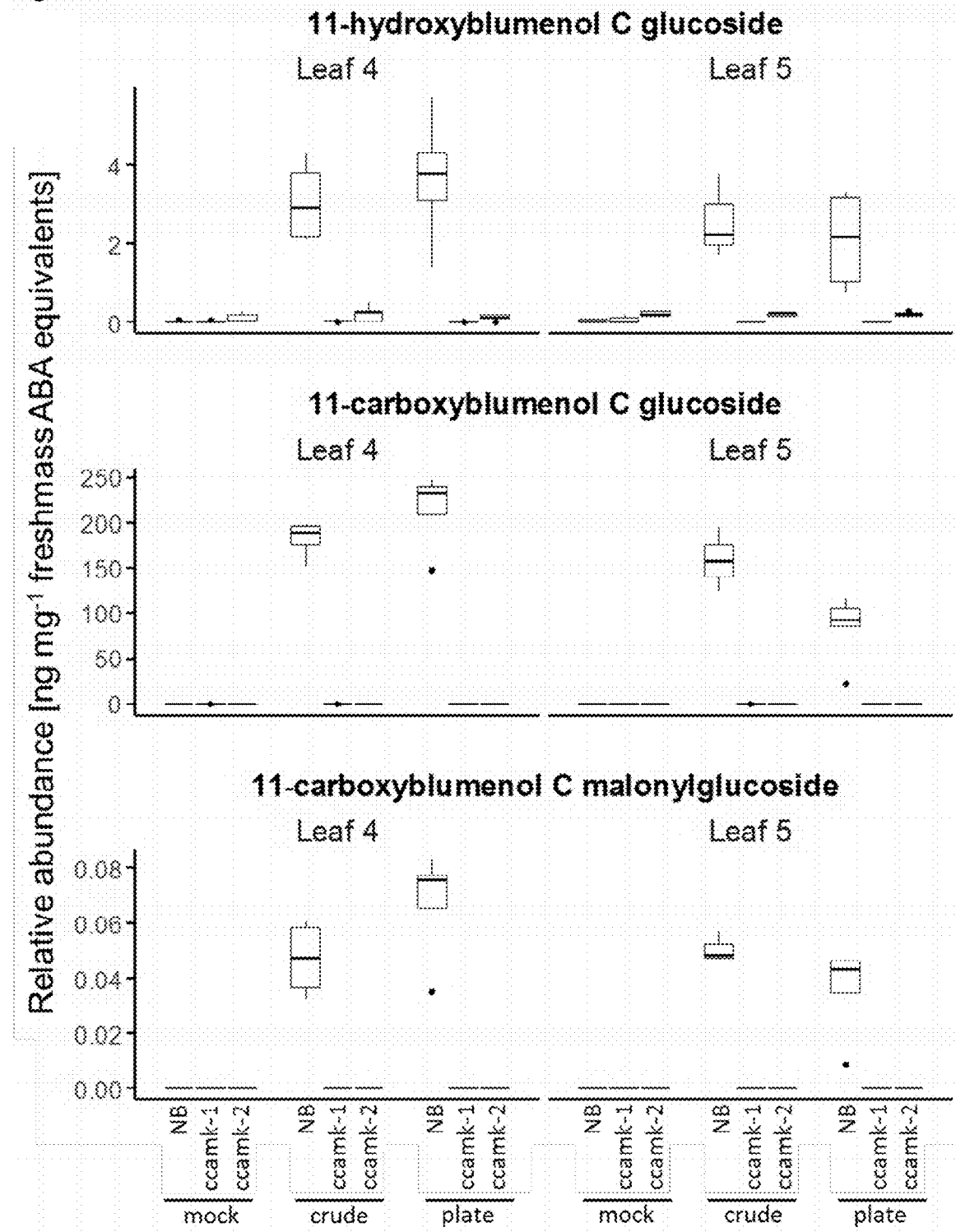

FIG. 8 Compounds 1 and 2 are leaf markers of root AMF colonization in O. sativa.

Leaf abundances of AMF marker compounds were quantified in rice wild-type Nipponbare (NB), ccamk-1 and ccamk-2 mutant plants without (mock) or with inoculation with crude or pure-culture (plate) Rhizophagus irregularis inoculum.

The examples illustrate the invention:

EXAMPLE 1

Materials and Methods

Plant Growth and AMF Inoculation

For our experiments with Nicotiana attenuata (Torr. ex S. Wats.), we used plants from the 31$^{st}$ inbred generation of the inbred 'UT' line, irCCaMK (A-09-1212-1; Groten et al. (2015) Silencing a key gene of the common symbiosis pathway in Nicotiana attenuata specifically impairs arbuscular mycorrhizal infection without influencing the root-associated microbiome or plant growth. Plant, Cell & Environment 38, 2398-2416) plants that are stably silenced in CCaMK via RNAi, the i-irPDS plants (A-11-92-4×A-11-325-4; Schäfer et al. (2013) "Real time" genetic manipulation: A new tool for ecological field studies. The Plant Journal 76, 506-518) harboring the LhGR/pOp6 system for chemically-inducible RNAi-mediated gene silencing of phytoene desaturase (PDS) and the respective empty vector (EV) transformed plants (A-04-266-3; Bubner et al. (2006) Occurrence of tetraploidy in Nicotiana attenuata plants after Agrobacterium-mediated transformation is genotype specific but independent of polysomaty of explant tissue. Plant Cell Reports 25, 668-675) as control. Details about the transformation and screening of the irCCaMK plants are described by Groten, et al. ((2015) Silencing a key gene of the common symbiosis pathway in *Nicotiana attenuata* specifically impairs arbuscular mycorrhizal infection without influencing the root-associated microbiome or plant growth. *Plant, Cell & Environment* 38, 2398-2416 and for the i-irPDS plants by Schäfer et al. ((2013) "Real time" genetic manipulation: A new tool for ecological field studies. *The Plant Journal* 76, 506-518). Seeds were germinated on Gamborg B5 as described by Krügel et al. ((2002) *Agrobacterium*-mediated transformation of *Nicotiana attenuata*, a model ecological expression system. *Chemoecology* 12, 177-183). The used advance intercross recombinant inbred line (RIL) population was developed by crossing two *N. attenuata* inbred lines originating from accessions collected in Arizona (AZ) and Utah (UT), USA (Glawe et al. (2003) Ecological costs and benefits correlated with trypsin protease inhibitor production in *Nicotiana attenuata*. *Ecology* 84, 79-90, Zhou et al. (2017) Tissue-specific emission of (E)-alpha-bergamotene helps resolve the dilemma when pollinators are also herbivores. *Current Biology* 27, 1336-1341). Additionally, we used *Solanum lycopersicum* 'Moneymaker', *Hordeum vulgare* 'Elbany' and *Triticum aestivum* 'Chinese Spring' plants.

For glasshouse experiments, plants were treated according to Groten et al. ((2015) Silencing a key gene of the common symbiosis pathway in *Nicotiana attenuata* specifically impairs arbuscular mycorrhizal infection without influencing the root-associated microbiome or plant growth. *Plant, Cell & Environment* 38, 2398-2416). In brief, they were transferred into dead (autoclaved twice at 121° C. for 30 min; non-inoculated controls) or living inoculum (*R. irregularis*, Biomyc Vital, www.biomyc.de, inoculated plants) diluted 1:10 with expanded clay (size: 2-4 mm). Pots were covered with a thin layer of sand. Plants were watered with distilled water for 7 d and subsequently fertilized every second day either with a full strength hydroponic solution (for 1 L: 0.1292 g $CaSO_4 \times 2H_2O$, 0.1232 g $MgSO_4 \times 7H_2O$, 0.0479 g $K_2HPO_4$, 0.0306 g $KH_2PO_4$, 2 mL $KNO_3$ (1 M), 0.5 mL micronutrients, 0.5 mL Fe diethylene triamine pentaacetic acid) or with a low P hydroponics solution containing only $\frac{1}{10}$ of the regular P-concentration (0.05 mM). Plants were grown separately in 1 L pots, if not stated otherwise. In the paired design (FIG. 1), irCCaMK plants were grown together with EV plants in 2 L pots and the watering regime was changed to % of the regular P-concentration after plants started to elongate. Glasshouse experiments with natural inoculum (FIG. 2C) were conducted in a mesocosm system (4 boxes, each 2 pairs of EV and irCCaMK plants). Plants were maintained under standard glasshouse conditions (16 h light, 24-28° C., and 8 h dark, 20-24° C. and 45-55% humidity) with supplemental light supplied by high-pressure sodium lamps (Son-T-Agro).

The field experiments were conducted as described by Schuman et al. ((2012) Herbivory-induced volatiles function as defenses increasing fitness of the native plant *Nicotiana attenuata* in nature. *Elife* 1, e00007). Seedlings were transferred to Jiffy pots and planted into a field plot at the Lytle Ranch Preserve in the Great Basin Desert (Utah, USA: N 37.1412, W 114.0275). Field season 2016 (FIG. 2D): field experiments were conducted under the US Department of Agriculture Animal and Plant Health Inspection Service (APHIS) import permission numbers 10-004-105m (irCCaMK) and 07-341-101n (EV) and the APHIS release permission number 16-013-102r. EV and irCCaMK plants were planted in communities of six plants, either of the same genotype or with both genotypes in equal number.

Samples Prepared at Other Laboratory Facilities:

*Medicago truncatula* (FIGS. 4 and 5) and *Brachypodium distachyon* (FIGS. 4 and 5) samples were prepared at the laboratory of Prof. Maria Harrison from the Boyce Thompson Institute for Plant Research (Ithaca, NY., USA).

*Solanum lycopersicum* 'Moneymaker' (FIG. 5) and *Solanum tuberosum* (FIG. 4) samples were prepared at the laboratory of Prof. Philipp Franken by Dr. Michael Bitterlich from the Leibniz-Institute of Vegetable and Ornamental Crops (IGZ, Großbeeren/Erfurt, Germany).

Inducible PDS Silencing

For the temporal and spatial restriction of PDS gene silencing, we treated the petiole of the second oldest stem leaf of AMF-inoculated and non AMF-inoculated i-irPDS and EV plants with a 100 µM dexamethasone-containing lanolin paste (1% v/v DMSO). The lanolin paste was prepared and applied as described by Schäfer et al. ((2013) "Real time" genetic manipulation: A new tool for ecological field studies. *The Plant Journal* 76, 506-518). The treatment started 3 weeks after potting and was conducted for 3 weeks. The lanoline paste was refreshed twice per week. On each plant the treated leaf and the adjacent, untreated leaves were harvested for analysis.

Sample Collection

During harvests, roots were washed and briefly dried with a paper towel. Subsequently, they were cut into 1 cm pieces and mixed. Plant tissues were shock-frozen in liquid nitrogen immediately after collection, ground to a fine powder and stored at −20° C. (short-term storage)/−80° C. (long-term storage) until extraction. From the root samples, an aliquot was stored in root storage solution (25% ethanol and 15% acetic acid in water) at 4° C. for microscopic analysis. *S. lycopersicum* and *S. tuberosum* samples from IGZ were provided as dry material.

For stem sap collection, branches of *N. attenuata* plants were cut into 1.5 cm long pieces and placed into small 0.5 mL reaction tubes with a small hole in the tip, which were placed in a larger 1.5 mL reaction tube. The tubes were centrifuged for 15 min at 10 000×g. The stem sap from the larger reaction tubes were collected and stored at −20° C.

Stress Treatments

Herbivory treatments were conducted by placing *Manduca sexta* neonates, originating from an in-house colony, on the plants. After feeding for 2 weeks, rosette leaves were harvested. As controls, we harvested leaves from untreated plants.

For bacteria and virus infection, plants were inoculated plants with *Agrobacterium tumefaciens* carrying the Tobacco rattle virus. The inoculation was conducted by infiltrating leaves with a bacteria solution using a syringe. The treatment was conducted as described for virus-induced gene silencing described by Ratcliff et al. ((2001) Technical Advance. Tobacco rattle virus as a vector for analysis of gene function by silencing. *The Plant Journal* 25, 237-45) and by Saedler and Baldwin ((2004) Virus-induced gene silencing of jasmonate-induced direct defences, nicotine and trypsin proteinase-inhibitors in *Nicotiana attenuata*. *Journal of Experimental Botany* 55, 151-157). After incubation for 3 weeks, stem leaves of the treated plants and untreated control plants were harvested.

The fungal infection was done with *Botrytis cinerea*. On each plant, three leaves were treated by applying 6 droplets each containing 10 µL of *B. cinerea* spore suspension ($10^6$ spores/mL in Potato Extract Glucose Broth, Carl Roth GmbH) to the leaf surface. As control, plants were treated with broth without spores in the same way. Samples were collected after 4 days incubation.

Drought stress was induced by stopping the watering for 4 d. Subsequently, stem leaves of the drought-stressed plants and the continuously watered control plants were harvested. In contrast to the other samples of the stress experiment, leaves were dried before analysis to compensate for weight differences caused by changes in the water content.

Sample Preparation—Extraction and Purification

For extraction, samples were aliquoted into reaction tubes, containing two steel balls. Weights were recorded for later normalization. Per 100 mg plant tissues, approximately 1 mL 80% MeOH was added to the samples before being shaken in a GenoGrinder 2000 (SPEX SamplePrep) for 60 s at 1150 strokes min$^{-1}$. After centrifugation, the supernatant was collected and analyzed. For triple-quadrupole MS quantification, the extraction buffer was spiked with 10 ng stable isotope-labeled abscisic acid ($D_6$-ABA, HPC Standards GmbH) as an internal standard.

Stem sap was diluted 1:1 with MeOH spiked with $D_6$-ABA as an internal standard. After centrifugation, the supernatant was collected and analyzed.

The purification of N. attenuata leaf extracts for high resolution MS was conducted by solid-phase-extraction (SPE) using the Chromabond HR-XC 45 μm benzensulfonic acid cation exchange columns (Machery-Nagel) to removed abundant constituents, such as nicotine and phenolamides. After purification the samples were evaporated to dryness and reconstituted in 80% methanol.

Compound identification was conducted by NMR with purified fractions of root and leaf extracts. Compounds 1, 3 and 4 were extracted from root tissues of N. attenuata and purified by HPLC (Agilent-HPLC 1100 series; Grom-Sil 120 ODS-4 HE, C18, 250×8 mm, 5 μm; equipped with a Gilson 206 Abimed fraction collector). Compounds 2 and 7 were extracted from a mixture of leaf tissues from different plant species (M. truncatula, Z. mays, S. lypersicum and N. attenuata). The first purification step was conducted by SPE using the Chromabond HR-XC 45 μm benzensulfonic acid cation exchange columns (Machery-Nagel) to remove hydrophilic and cationic constituents. Additional purification steps were conducted via HPLC (Agilent-HPLC 1100 series; Phenomenex Luna C18(2), 250×10 mm, 5 μm; equipped with a Foxy Jr. sample collector) and UHPLC (Dionex UltiMate 3000; Thermo Acclaim RSLC 120 C18, 150×2.1 mm, 2.2 μm; using the auto-sampler for fraction collection).

Untargeted MS Based Analyses

For high resolution mass spectrometry (MS), indiscriminate tandem mass spectrometry (idMS/MS), tandem MS (MS2) and pseudo-MS3 we developed a chromatographic method using a mixture of solvent A: water (Milli-Q, Merck, emdmillipore.com) with 0.1% acetonitrile and 0.05% formic acid and solvent B: acetonitrile with 0.05% formic acid. Ultra high performance liquid chromatography (UHPLC) was performed using a Dionex UltiMate 3000 rapid separation LC system (Thermo Fisher, thermofisher.com), combined with a Thermo Acclaim RSLC 120 C18, 150×2.1 mm, 2.2 μm column. The solvent composition changed from a high % A in a linear gradient to a high % B followed by column equilibration steps and the return to the starting conditions. The flow rate was set to 0.3 mL/min. MS detection was performed using a microTOF-Q II MS system (Bruker Daltonics, bruker.com), equipped with an electrospray ionization (ESI) source operating in positive ion mode. ESI conditions for the micrOTOF-Q II system were end plate offset 500 V, capillary voltage 4500 V, capillary exit 130 V, dry temperature 180° C. and a dry gas flow of 10 L min-1. Mass calibration was performed using sodium formiate (250 mL isopropanol, 1 mL formic acid, 5 mL 1 M NaOH in 500 mL water). Data files were calibrated using the Bruker high-precision calibration algorithm. Instrument control, data acquisition and reprocessing were performed using HyStar 3.1 (Bruker Daltonics).

idMS/MS was conducted in order to gain structural information on the overall detectable metabolic profile. For this, samples were first analyzed by UHPLC-ESI/qTOF-MS using the single MS mode (producing low fragmentations resulting from in-source fragmentation) by scanning from m/z 50 to 1400 at a rate of 5000 scans/s. MS/MS analyses were conducted using nitrogen as collision gas and involving independent measurements at the following 4 different collision-induced dissociation (CID) voltages: 20, 30, 40 and 50 eV. The quadrupole was operated throughout the measurement with the largest mass isolation window, from m/z 50 to 1400. Mass fragments were scanned between m/z 50 to 1400 at a rate of 5000 scans/s. For the idMS/MS assembly, we used a previously designed precursor-to-product assignment pipeline (Li et al. (2015) Navigating natural variation in herbivory-induced secondary metabolism in coyote tobacco populations using MS/MS structural analysis. *Proceedings of the National Academy of Sciences* 112, E4147-E4155, Li et al. (2016) Illuminating a plant's tissue-specific metabolic diversity using computational metabolomics and information theory. *Proceedings of the National Academy of Sciences* 113, E7610-E7618) using the output results for processing with the R packages XCMS and CAMERA.

Additional MS/MS experiments were performed on the molecular ion at various CID voltages. For the fragmentation of the proposed aglycones via pseudo-MS$^3$, we applied a 60 eV in-source-CID transfer energy which produced spectra reflecting the loss of all sugar moieties.

Structure Elucidation by NMR

Purified fractions were dried completely and reconstituted in MeOH-$d_3$ before analysis by nuclear magnetic resonance spectroscopy (NMR) on an Avance AV700 MD NMR spectrometer (Bruker-Biospin, Karlsruhe, Germany) at 298 K using a 1.7 mm TCl CryoProbe™. Chemical shift values (δ) are given relative to the residual solvent peaks at $δ_H$ 3.31 and $δ_C$ 49.05, respectively. Carbon shifts were determined indirectly from $^1$H-$^{13}$C HSQC and HMBC spectra.

Targeted Metabolite Analysis

For chromatographic separations, a UHPLC (Dionex UltiMate 3000) was used to provide a maximum of separation with short run times. This reduced the disturbance by other extract components (matrix effects), increased the specificity of the method, and met the requirements of a HTP analysis. The auto-sampler was cooled to 10° C. As a stationary phase, we used a reversed phase column (Agilent ZORBAX Eclipse XDB C18, 50×3.0 mm, 1.8 μm) suitable for the separation of moderately polar compounds. Column temperature was set to 42° C. As mobile phases, we used: A, 0.05% HCOOH, 0.1% ACN in $H_2O$ and B, MeOH, the composition of which was optimized for an efficient separation of blumenol-type compounds within a short run time. We included in the method a cleaning segment at 100% B and an equilibration segment allowing for reproducible results across large samples sets. The gradient program was as follows: 0-1 min, 10% B; 1-1.2 min, 10-35% B; 1.2-5 min, 35-50% B; 5-5.5 min, 50-100% B; 5.5-6.5 min, 100% B; 6.5-6.6 min, 100-10% B and 6.6-7.6 min, 10% B. The flow rate was set to 500 μL min Analysis was performed on a Bruker Elite EvoQ triple quadrupole MS equipped with a HESI (heated electrospray ionization) ion source. Source parameters were as follows: spray voltage (+), 4500V; spray voltage (−), 4500V; cone temperature, 350° C.; cone gas flow, 35; heated probe temperature, 300° C.; probe gas flow, 55 and nebulizer gas flow, 60. Samples were analyzed in multi-reaction-monitoring (MRM) mode (Table 4).

TABLE 4

MRM-settings used for targeted blumenol analysis

| Nr. | Compound Name | RT | Q1 [m/z] [a, b] | Q3 [m/z] [c, d] (CE [V]) |
|---|---|---|---|---|
| 1 | 11-hydroxyblumenol C-Glc [f, g] | 2.82 | +389.22 | 227.16 (−2.5), 209.15 (−7.5), 191.14 (−12.5), 163.10 (−15), 149.10 (−17.5) |
| 2 | 11-carboxyblumenol C-Glc [f, g] | 3.22 | +403.22 | 241.16 (−2.5), 223.15 (−7.5), 177.10 (−15), 195.14 (−12.5) |
|   |   |   | +241.16 [e] | 223.15 (−5), 177.10 (−15), 195.14 (−10) |
| 3 | 11-hydroxyblumenol C-Glc.Glc [f, g] | 2.5 | +551.27 | 389.22 (−2.5), 227.16 (−7.5), 209.15 (−10), 191.14 (−15), 149.10 (−20) |
| 4 | Blumenol C - Glc-Glc [f, g] | 3.47 | +535.27 | 373.22 (−2.5), 211.00 (−10), 193.10 (−17.5), 135.00 (−22.5), 109.00 (−22.5) |
| 5 | Blumenol C - Glc [f, h] | 4.18 | +373.22 | 211.20 (−6), 193.16 (−9), 175.10 (−15), 135.12 (−16), 109.10 (−20) |
| 7 | Blumenol B - Glc [f, g] | 2.5 | +389.22 | 227.16 (−5), 209.15 (−7.5), 191.14 (−12.5), 153.10 (−17.5), 149.10 (−17.5) |
| 8 | Blumenol C - Glc-GlcU [i] | 3.25 & 3.38 | +549.27 | 373.22 (−2.5), 211.00 (−10), 193.10 (−17.5), 135.00 (−22.5), 109.00 (−22.5) |
| 9 | 11-hydroxylumenol C - Glc-Rha [i] | 2.8 | +535.27 | 389.22 (−2.5), 227.16 (−7.5), 209.15 (−10), 191.14 (−15), 149.10 (−20) |
| 10 | Blumenol C - Glc-Rha [i] | 4.1 | +519.27 | 373.22 (−2.5), 211.00 (−10), 193.10 (−17.5), 135.00 (−22.5), 109.00 (−22.5) |
| 11 | Hydroxyblumenol C-Hex-Pen [i] | 2.5 | +521.27 | 389.22 (−2.5), 227.16 (−7.5), 209.15 (−10), 191.14 (−15), 149.10 (−20) |
|   | $D_6$-ABA [h] | 4.5 | −269.17 | 159.00 (10) |

RT: retention time
CE: collision energy
Glc: glucose
GlcU: glucuronic acid
Rha: rhamnose
Hex: hexose
Pen: pentose
[a] Resolution: 0.7
[b] [M + H]⁺ or [M − H]⁻ if not stated differently
[c] Resolution: 2
[d] Quantifiers are depicted in bold
[e] [M + H-Glc]⁺
[f] Verified by high resolution MS
[g] Verified by NMR
[h] Optimized with commercial available standards
[i] Transitions predicted based on structural similar compounds and literature information Adjusted Method for Targeted Blumenol Analysis in *N. attenuata*

The AMF-indicative markers in *N. attenuata*, Compound 1 and 2, and the internal standard ($D_6$-ABA) have been analyzed. Accordingly, the gradient program was adjusted as follows: 0-1 min, 10% B; 1-1.2 min, 10-35% B; 1.2-3 min, 35-42% B; 3-3.4 min, 42-100% B; 3.4-4.4 min, 100% B; 4.4-4.5 min, 100-10% B and 4.5-5.5 min, 10% B. The MRM settings are shown in Table 5.

TABLE 5

MRM-settings for the analysis of selected blumenols in *N. attenuate*

| Nr. | Compound Name | RT | Q1 [m/z] [a, b] | Q3 [m/z] [c, d] (CE [V]) |
|---|---|---|---|---|
| 1 | 11-hydroxyblumenol C-Glc [f, g] | 2.82 | +389.22 | 227.16 (−2.5), 209.15 (−7.5), 191.14 (−12.5), 163.10 (−15), 149.10 (−17.5) |
| 2 | 11-carboxyblumenol C-Glc [f, g] | 3.22 | +403.22 | 241.16 (−2.5), 223.15 (−7.5), 177.10 (−15), 195.14 (−12.5) |
|   |   |   | +241.16 [e] | 223.15 (−5), 177.10 (−15), 195.14 (−10) |
|   | $D_6$-ABA [h] | 4.0 | −269.17 | 159.00 (10) |

RT: retention time
CE: collision energy
Glc: glucose
Hex: hexose
Pen: pentose
[a] Resolution: 0.7
[b] [M + H]⁺ or [M − H]⁻ if not stated differently
[c] Resolution: 2
[d] Quantifiers are depicted in bold
[e] [M + H-Glc]⁺
[f] Verified by high resolution MS
[g] Verified by NMR
[h] Optimized with commercial available standards Determination of the AMF Colonization Rate To determine the fungal colonization rates and mycorrhizal structures, root samples were stained and analyzed by microscopy. For WGA-Alexa Fluor 488 staining, roots were first washed with distilled water and then soaked in 50% (v/v) ethanol overnight. Roots were then boiled in a 10% (w/v) KOH solution for 10 minutes. After rinsing with water, the roots were boiled in 0.1 M HCl solution for 5 minutes. After rinsing with water and subsequently with 1× phosphate-buffered saline solution, roots were stained in 1× phosphate-buffered saline buffer containing 0.2 mg mL$^{-1}$ WGA-Alexa Fluor 488 overnight in the dark. Zeiss confocal microscopy (LSM 510 META) was used to detect the WGA-Alexa Fluor 488 (excitation/emission maxima at approximately 495/519 nm) signal. Trypan blue staining was performed as described by Brundrett et al. ((1984) A new method for observing the morphology of vesicular-arbuscular mycorrhizae. *Canadian Journal of Botany* 62, 2128-2134) to visualize mycorrhizal structures. For the counting of mycorrhization, 15 root fragments, each about 1 cm long, were stained with either trypan blue or WGA-488 followed by slide mounting. More than 150 view fields per slide were surveyed with 20× object magnification and classified into 5 groups: no colonization, only hyphae (H), hyphae with arbuscules (H+A), hyphae with vesicles (V+H), and hyphae with arbuscules and vesicles (A+V+H). The proportions of each group were calculated by numbers of each group divided by total views.

For the molecular biological analysis of colonization rates, RNA was extracted from the roots using the RNeasy Plant Mini Kit (Qiagen) or NucleoSpin® RNA Plant (Macherey-Nagel) according to the manufacturer's instructions and cDNA was synthesized by reverse transcription using the PrimeScript RT-qPCR Kit (TaKaRa). Quantitative (q)PCR was performed on a Stratagene Mx3005P qPCR machine using a SYBR Green containing reaction mix (Eurogentec, eurogentec.com; qPCR Core kit for SYBR Green I No ROX). We analyzed the *R. irregularis* specific housekeeping gene, Ri-tub (GenBank: EXX64097.1), as well as the transcripts of the AMF-induced plant marker genes RAM1, Vapyrin, STR1 and PT4. The signal abundance was normalized to NaIF-5a (NCBI Reference Sequence: XP_019246749.1).

Transcript Analysis of the Apocarotenoid Pathway

The transcript analysis of the methylerythritol 4-phosphate (MEP) and (apo)carotenoid pathway was conducted based on RNA-seq by using *N. attenuata* roots with or without *R. irregularis* inoculations. The data analysis methods are based on the previously published pipeline of Ling et al. ((2015) Insect herbivory elicits genome-wide alternative splicing responses in *Nicotiana attenuata*. *The Plant Journal* 84, 228-243). Representative values for transcripts abundances are TPM (Transcripts per kilobase of exon model per million mapped reads).

Blumenol Transfer Experiment

To analyze the root-to-shoot transfer potential of blumenols, we placed three *N. attenuata* seedlings, previously germinated on petri dishes with GB5 Agar for approximately 10 days, into 0.5 mL reaction tubes. The roots were placed into the tube, while the shoot projected out of the tube. The tubes were carefully covered with parafilm, which held the seedlings in place and isolated roots from shoots (see FIG. 3C). The tubes were filled with tap water supplemented with 0.5% v/v plant extracts enriched in Compounds 1 or 2 (unknown concentration; purified fractions), or a commercial available standard of Compound 6 (25 ng μL$^{-1}$ end concentration; Roseoside; Wuhan ChemFaces Biochemical Co., Ltd.). Compound 1 or 2 were prepared from a mix of leaf tissues from different plant species (*M. truncatula, Z. mays, S. lypersicum* and *N. attenuata*) by methanol extraction followed by purification by SPE (Chromabond HR-XC column) and HPLC (Agilent-HPLC 1100 series; Phenomenex Luna C18(2), 250×10 mm, 5 μm; equipped with a Foxy Jr. fraction collector). As a control, we used tap water supplemented with the respective amounts of MeOH. The seedlings were incubated for 1 d in a Percival climate chamber (16 h of light at 28° C., and 8 h of dark at 26° C.). During sample collection, roots and shoots were separated and the roots were rinsed in water (to reduce the surface contamination with the incubation medium). While the shoots were analyzed separately, the roots of all seedlings from the same treatment were pooled. Sample extraction was conducted as described above.

QTL Analysis

For quantitative trait loci (QTL) mapping, we used the AZ-UT RIL population described by Zhou et al. ((2017) Tissue-specific emission of (E)-alpha-bergamotene helps resolve the dilemma when pollinators are also herbivores. *Current Biology* 27, 1336-1341). The field experiments were conducted in 2017. Collected leaf samples were extracted as described with 80% MeOH spiked with $D_6$-ABA as internal standard and analyzed with the method described under 'Adjusted method for targeted blumenol analysis in *N. attenuata*'. The peak areas for Compound 2 were normalized by amount of extracted tissue, internal standard and log-transformed. Samples with missing genotype or phenotype information were removed. In total, 728 samples were used for QTL mapping analysis. QTL analysis was conducted according to Zhou et al. ((2017) Tissue-specific emission of (E)-alpha-bergamotene helps resolve the dilemma when pollinators are also herbivores. *Current Biology* 27, 1336-1341).

Statistics

Statistical analysis of the data was performed with R version 3.0.3 (R-project.org). The statistical methods used and the number of replicates are indicated in the figure legends.

EXAMPLE 2

Results

We performed an untargeted metabolomics analysis of root tissues in a transgenic, line of *Nicotiana attenuata*, silenced in the calcium- and calmodulin-dependent protein kinase (irCCaMK), and empty vector (EV) plants co-cultured with or without *Rhizophagus irregularis* (FIG. 1A). By using irCCaMK plants, unable to establish a functional AMF association (Groten et al. (2015) Silencing a key gene of the common symbiosis pathway in *Nicotiana attenuata* specifically impairs arbuscular mycorrhizal infection without influencing the root-associated microbiome or plant growth. *Plant, Cell & Environment* 38, 2398-2416), we were able to dissect the AMF association-specific metabolic responses from those changes that result from more general plant-fungus interactions. Untargeted metabolome profiling of roots using liquid chromatography (LC) coupled time-of-flight mass spectrometry (qTOF-MS) resulted in a concatenate data matrix consisting of 943 mass features (m/z signals detected at certain retention times). A coexpression network analysis was conducted in which nodes represent m/z features and edges connect metabolite mass features derived from similar in-source fragmentation origins and sharing biochemical relationships (Li et al. (2015) Navigating natural variation in herbivory-induced secondary metabolism in coyote tobacco populations using MS/MS structural analysis. *Proceedings of the National Academy of Sciences* 112, E4147-E4155, Li et al. (2016) illuminating a plant's tissue-specific metabolic diversity using computational metabolomics and information theory. *Proceedings of the National Academy of Sciences* 113, E7610-E7618). For example, features of well-known compounds, like nicotine and phenylalanine, were tightly connected (FIG. 1B). A STEM clustering pipeline was performed to recognize patterns of metabolic accumulations in the genotypes×treatment data matrix [(EV/irCCaMK)×(−/+AMF inoculation), respectively]. As a result, 5 of 8 computed distinct expression patterns were mapped onto the covariance network in FIG. 1B (shown in different grey levels). A tightly grouped cluster of unknown metabolites (FIG. 1B, upper left) occupied a distinct metabolic space. Metabolites grouped in this cluster were highly elicited upon mycorrhization in EV, but not in irCCaMK plants (FIG. 1C). It is also noteworthy that this group of compounds appeared to be de novo synthesized, as none were detected in non-inoculated plants (FIG. 1C). The structures of the compounds of this cluster were annotated based on tandem-MS and NMR data. Five metabolites were annotated as blumenols: 11-hydroxyblumenol-C-9-O-Glc (FIG. 1C; Compound 1), 11-carboxyblumenol-C-9-O-Glc (FIG. 1C; Compound 2), 11-hydroxyblumenol-C-9-O-Glc-Glc (Compound 3), blumenol-C-9-O-Glc-Glc (Compound 4) and blumenol-C-9-O-Glc (Compound 5).

To trace these compounds throughout the plant, we used a more sensitive and specifically targeted metabolomics approach based on LC-triple-quadrupole-MS. The abundance of the five blumenol-C-glycosides continually increased with mycorrhizae development and was highly correlated with mycorrhization rate determined based on transcript abundances of classical marker genes (fungal house-keeping gene, Ri-tubuline; in-planta marker genes, Vapyrin, RAM1, STR1 and PT4; Park et al. (2015) Hyphal branching during arbuscule development requires *Reduced Arbuscular Mycorrhiza*1. *Plant Physiology* 169, 2774-2788).

Compounds 1 and 2 showed a similar AMF-specific accumulation in the leaves, as observed in the roots (FIG. 1D). The other analyzed blumenols were not detected in leaves (Compounds 3 and 4) or showed a less consistent AMF-specific accumulation (Compound 5; due to its constitutive background level). The identity of Compounds 1 and 2 in the leaves was verified by high resolution qTOF-MS in a procedure which required additional sample purification and concentration steps due to their low abundance and high matrix effects in leaves, the likely reasons why previous un-targeted metabolomics attempts had failed to detect these signatures.

Next, we determined the correlations among the contents of AMF-indicative foliar Compounds 1 and 2 and root colonization rates. In a kinetic experiment, both compounds increased their accumulations in the leaves of plants inoculated with *R. irregularis* (FIG. 2A). In contrast, the classical AMF-marker-genes, which are usually analyzed in the roots, did not respond in the leaves. In an inoculum-gradient experiment using increasing inoculum concentrations, proportionally higher Compound 1 and 2 levels were observed (FIG. 2B), accurately reflecting the differential colonization of roots across treatments (FIG. 2E). In addition to inoculations with single AMF-species (*R. irregularis*), we also tested mycorrhizal inoculum originally collected from the plant's native habitat, the Great Basin Desert in Utah, USA, which mainly consists of *Funneliformis mosseae* and *R. irregularis*. EV plants inoculated with this 'natural inoculum' also accumulated Compounds 1 and 2 in leaves, while irCCaMK plants did not (FIG. 2C). When planted into the plant's natural environment in Utah, both EV and irCCaMK plants could be clearly distinguished by their leaf Compound 1 and 2 contents. T the signature from Compound 2 provided a better quality marker in these field-grown plants (FIG. 2D). The foliar content of these two compounds was highly correlated with the percentage of arbuscules in roots, the core structure of AMF interactions (FIG. 2F). In contrast, other biotic or abiotic stresses, including herbivory, pathogen infection and drought stress, did not induce the foliar accumulations of Compounds 1 and 2, as has been described for roots (Maier et al. (1997) Accumulation of sesquiterpenoid cyclohexenone derivatives induced by an arbuscular mycorrhizal fungus in members of the Poaceae. *Planta* 202, 36-42). An analysis of various plant tissues, including different leaf positions, stem pieces, flowers and capsules revealed that these AMF-specific signatures accumulated throughout the shoot (FIG. 2G). Taken together, we conclude that the contents of particular blumenols in aerial plant parts robustly reflect the degree of mycorrhization in *N. attenuata* plants.

Blumenols are apocarotenoids originating from a side branch of the carotenoid pathway (Hou et al. (2016) Synthesis and function of apocarotenoid signals in plants. *Trends in Plant Science* 21, 792-803). Most of the genes likely associated with blumenol biosynthesis were upregulated in roots, but not in leaves of *N. attenuata* plants in response to mycorrhization (FIG. 3A). We inferred that the AMF-indicative leaf apocarotenoids are transported from their site of synthesis in colonized roots to other plant parts. This is consistent with the occurrence of blumenols in stem sap, which was collected by centrifuging small stem pieces. To clarify the origins (local biosynthesis vs. transport) of these AMF-indicative leaf blumenols, we genetically manipulated the carotenoid biosynthesis of *N. attenuata* plants. To minimize the effects of a disturbed carotenoid biosynthesis on the AMF-plant interaction, we used the dexamethasone (DEX)-inducible pOp6/LhGR system to silence the phytoene desaturase (PDS) expression in a single DEX-treated leaf position (Schäfer et al. (2013) "Real time" genetic manipulation: A new tool for ecological field studies. *The Plant Journal* 76, 506-518). Treated leaves showed clear signs of bleaching indicating PDS silencing (FIG. 3B), but levels of the AMF-indicative Compounds 1 and 2 were not affected, consistent with their transport from other tissues, likely the highly accumulating roots. As a control, we analyzed the non-AMF-inducible Compound 6, showing constitutive levels in aerial tissues. In DEX-treated leaves, Compound 6 concentrations were reduced by nearly 40 percent, consistent with local production (FIG. 3B). To confirm the within-plant transport potential of blumenols, we dipped roots of seedlings into aqueous solutions of Compounds 1 or 2. After overnight incubation, the blumenol derivatives were clearly detected not only in roots, but also in shoots (FIG. 3C). We propose that the AMF-indicative blumenols (e.g., Compounds 1 and 2) are produced in colonized roots and transported to the shoot, while other AMF-independent blumenols (e.g., Compound 6) originate from local production and within-shoot transport (FIG. 3D).

To test the potential of these foliar metabolites as a screening tool, we quantified them in a forward genetics experiment, an experiment which would be challenging with the classical screening tools of root staining or nucleic acid analysis. We focused our analysis on Compound 2 due to the superior quality of its signature in the leaves of field-grown plants. The experiment consisted of a recombinant inbred line population of two *N. attenuata* accessions (Utah, UT and Arizona, AZ)(Zhou et al. (2017) Tissue-specific emission of (E)-alpha-bergamotene helps resolve the dilemma when pollinators are also herbivores. *Current Biology* 27, 1336-1341) which differ in mycorrhization (FIGS. 4A-B) and accumulations of foliar Compound 2 in the glasshouse (FIG. 4C). A QTL analysis of 728 plants grown across a 7200 m$^2$ field plot (FIG. 4D) revealed that the abundance of Compound 2 mapped to a single locus on linkage group 3 (FIG. 4E), which harbored a homologue of NOPE1, previously shown to be required for the initiation of AMF symbioses in maize and rice (Nadal et al. (2017) An N-acetylglucosamine transporter required for arbuscular mycorrhizal symbioses in rice and maize. *Nature plants* 3, 17073-17073). While clearly requiring additional follow-up work, these results highlight the value of these signature metabolites for HTP screenings, which form the basis of most crop improvement programs.

The AMF-specific accumulation of blumenol-C-derivatives in roots is a widespread phenomenon within higher plants (Strack and Fester (2006) Isoprenoid metabolism and plastid reorganization in arbuscular mycorrhizal roots. *New Phytologist* 172, 22-34); however, how general are the observed blumenol changes in aerial parts across different combinations of plants and AMF species? We analyzed *Solanum fycopersicum, Triticum aestivum* and *Hordeum vulgare* plants with and without AMF inoculation and again we found an overlap in the AMF-specific blumenol responses in roots and leaves, consistent with the transport hypothesis. Further analyses lead to the identification of additional AMF-indicative blumenols in the leaves of *Medicago truncatula, S. tuberosum* and *Brachypodium distachyon*. We identified various types of blumenols that showed an AMF-specific accumulation in the shoot, including blumenol-B (Compound 7), which has not previously been reported in an AMF-dependent context (FIG. 4F). As reported for roots, the particular blumenol types were species-dependent, but the general pattern was widespread across monocots and dicots in experiments conducted at different research facilities. In tests with different fungal species (*Rhizophagus irregularis, Funneliformis mosseae* and *Glomus versiforme*), the observed effects were not found restricted to specific AMF taxa (FIGS. 4F and 5). In short, the method is robust.

EXAMPLE 3

Optimization of AMF Marker Analysis for Rice (*Oryza sativa*) Plants

Blumenol markers in (i) rice wild-type Nipponbare (NB) and (ii) two mutant genotypes deficient in Calcium- and Calmodulin-dependent protein kinase (CCaMK) which are unable to form a functional AMF association (ccamk-1 and ccamk-2) have been analyzed.

Samples were harvested from two leaf positions, leaf 4 (L4) and leaf 5 (L5), of plants treated with three different AMF inoculation treatments: without AMF (mock), with a *Rhizophagus irregularis* inoculum prepared from colonized *Tagetes* roots (crude) or a *R. irregularis* inoculum from a pure culture on sterile carrot roots (plate). Frozen tissue samples (100 mg) were ground and extracted with 0.8 mL extraction buffer (80% methanol) containing 10 ng of D6-ABA as internal standard.

After an initial screening for blumenol-related compounds we identified suitable markers indicating the colonization of rice plants with *R. irregularis* (FIGS. 6 and 7).

The identified AMF marker compounds were quantified using compound-specific multiple-reaction-monitoring (MRM, Table A) on a triple-quadrupole UPLC-MSMS as described in Wang et al. 2018.

TABLE A

MRM settings used for the quantification of specific blumenol derivatives in rice leaves.

| Compound name | RT [min] | Quantifier m/z [CE] | Qualifier m/z [CE] |
| --- | --- | --- | --- |
| 11-hydroxyblumenol C-Glc | 2.81 | (+) 389.2 > 209.2 [7.5 V] | 227.2 [2.5 V], 191.1 [12.5 V], 163.1 [15.0 V], 149.1 [17.5 V] |
| 11-carboxyblumenol C-Glc | 3.17 | (+) 241.2 > 195.1 [10.0 V] | 223.2 [5.0 V], 177.1 [15.0 V] |
| 11-carboxyblumenol-MalGlc | 3.60 | (+) 489.2 > 195.1 [12.5 V] | 241.2 [2.5 V], 223.2 [7.5 V], 177.1 [15.0 V] |
| $D_6$-abscisic acid (IS) | 4.01 | (−) 269.2 > 159.0 [10.0 V] | |

RT: retention time [min];

CE: collision energy;

IS: internal standard

Similarly to other plant-AMF systems (i.e. *Nicotiana attenuata*), the abundances of 11-carboxy- and 11-hydroxyblumenol C glucoside were indicative of AMF colonization. Additionally, a malonylated derivative of the carboxyblumenol glucoside was showing a similar pattern of AMF-induced accumulation in wild-type NB rice plants which is abolished in the two ccamk mutants (FIG. 8).

The invention claimed is:

1. A method of determining a mycorrhizal association of a first plant with an arbuscular mycorrhizal fungus (AMF), said method comprising:
   (a) determining the amount of a blumenol marker for mycorrhizal association in an aerial part of said first plant, wherein said blumenol marker is 11-hydroxyblumenol-C-9-O-Glc and said first plant is a vascular plant selected from a *Nicotiana* plant, a *Triticum* plant, a *Hordeum* plant, and an *Oryza* plant, optionally wherein said first plant has been brought into contact with an AMF prior to said determining, and wherein said determining comprises taking a sample from said aerial part and measuring the amount of said blumenol marker at a time point between about two weeks and about ten weeks after a said contact with an AMF
   (b) selecting a second plant from one of (i) a second plant wherein said second plant belongs to the same species as said first plant and is free of any association with an AMF, (ii) a second plant wherein said second plant belongs to the same species as said first plant and has an association with an AMF, (iii) a second plant wherein said first plant and said second plant are the same individual at different points in time, optionally wherein said second plant is the same individual at an earlier point in time than said first plant, and (iv) a second plant wherein the mycorrhization status of said second plant is not known;
   (c) comparing said amount of said blumenol marker in said aerial part of said first plant to the amount of said blumenol marker determined in an aerial part of said second plant; and
   (d) determining said association of said first plant with an AMF after said comparing step, selected from at least one of
      (i) selecting said first plant for it having a higher amount of said blumenol marker in said aerial part of said first plant as compared to said second plant when said second plant is free of any association with an AMF, and, thereby, having an increased AMF association as compared to said second plant,
      (ii) selecting said first plant for it having a higher amount of said blumenol marker in said aerial part of said first plant as compared to said second plant when said second plant has an association with an AMF or when said second plant is the same individual at a different point in time, or when said mycorrhization status of said second plant is not known, and, thereby, having a higher degree of AMF association as compared to said second plant,
      (iii) selecting said first plant for it having a lower amount of said blumenol marker in said aerial part of said first plant as compared to said second plant when said second plant has an association with an AMF, and, thereby, having a lower degree of AMF association as compared to said second plant, and
      (iv) selecting said first plant for it having an about equal amount of said blumenol marker in said aerial part of said first plant as compared to said second plant when said second plant is free of any association with an AMF, and, thereby, not having an AMF association.

2. The method of claim 1, wherein said amount of said blumenol marker in said aerial part of said first plant is determined in a sample from said aerial part of said first plant wherein said amount is optionally determined for one, two, or a plurality of first plants, and for one, two, or a plurality of samples from each said first plant, and said amount of said blumenol marker in said aerial part of said second plant, is selected from at least one of:
   (i) the amount of said blumenol marker determined in a sample from an aerial part of said second plant wherein said second plant is known to be free of any mycorrhizal association with an AMF,
   (ii) the amount of said blumenol marker determined in a sample from an aerial part of said second plant wherein said second plant is known to have a mycorrhizal association with an AMF,
   (iii) the amount of said blumenol marker determined in a sample from an aerial part of said second plant wherein said first plant and said second plant are the same individual at different points in time,
   (iv) the amount of said blumenol marker determined in a sample from an aerial part of said second plant wherein the mycorrhization status of said second plant is not known,
   (v) a reference value taken from a knowledge base, wherein said value is the amount of said blumenol marker determined in an aerial part of a plant of the same species as said first plant wherein the mycorrhization status of said second plant is known,
   (vi) a reference value taken from a knowledge base wherein said value is a baseline value for a plant of the same species, and
   (vii) a predefined value for a said amount of said blumenol marker indicative of a given mycorrhization status for a plant of the same species;
   and
   wherein said amount of said blumenol marker determined in said sample from said aerial part of said first plant is indicative of the degree of said mycorrhizal association.

3. The method of claim 1, wherein said determining on the basis of said amount of said blumenol marker for said mycorrhizal association is selected from at least one of qualitative determining and quantitative determining.

4. The method of claim 1, for determining whether said first plant has AMF receptivity, comprising:
   (a) contacting said first plant with an AMF known to be capable of colonization wherein said contacting is prior to said determining the amount of said blumenol marker in a sample from said aerial part of said contacted first plant;
   (b) selecting a point in time between about two weeks and about ten weeks after said contacting and determining the amount of said blumenol marker in said sample from said aerial part of said contacted first plant at said point in time;
   (c) comparing said amount of said blumenol marker determined in said sample from said contacted first plant in step (b) and a reference amount of said blumenol marker in said aerial part of said second plant wherein said reference amount is selected from one of
      (i) a reference amount wherein said first plant and said second plant are the same individual at different points in time, and said reference amount is the amount of said blumenol determined in a sample from an aerial part of said individual prior to said first point of time in step (b), optionally wherein said reference amount is determined prior to said contacting in step (a);

(ii) a reference amount of said blumenol marker determined in a sample from an aerial part of said second plant wherein said second plant is free of any association with an AMF; and (iii) a reference amount wherein said amount is a reference value taken from a knowledge base and said value is a baseline value for a plant of the same species, (d) obtaining a difference between said amount determined in step (b) and said reference amount of step (c); wherein a higher amount of said blumenol marker in said sample from said contacted first plant determined in step (b) as compared to said reference amount of step (c) is indicative of said AMF receptivity of said first plant, and said difference of step (d) is a measure of said receptivity; and (e) selecting each said contacted first plant for having said higher amount of said blumenol marker in said sample determined in step (b) as compared to said reference amount of step (c) and therefore said first plant has AMF receptivity.

5. The method of claim 4, further wherein step (a) comprises providing a plurality of said first plants and contacting each said plant of said plurality of said first plants with an AMF, thereby providing a contacted plurality of said first plants, wherein each said contacted first plant of said contacted plurality of said first plants belongs to the same species, and steps (b) to (e) comprise determining AMF receptivity for each said contacted first plant of said contacted plurality of said first plants, and selecting each said contacted first plant for having AMF receptivity.

6. The method of claim 1, for determining whether an AMF has colonization capability for said first plant, and quantifying said capability, comprising:

(a) selecting said first plant wherein said first plant is known to be receptive for colonization, selecting an AMF, and contacting said first plant with said AMF prior to determining the amount of said blumenol marker in a sample from said aerial part of said contacted first plant;

(b) selecting a point in time between about two weeks and about ten weeks after said contacting and determining the amount of said blumenol marker in said sample from an aerial part of said contacted first plant at said point in time;

(c) comparing said amount of said blumenol marker in said sample from said contacted first plant determined in step (b) and a reference amount of said blumenol marker in an aerial part of said second plant selected from one of (i) a reference amount wherein said first plant and said second plant are the same individual at different points in time, and said reference amount is the amount of said blumenol marker in said aerial part of said second plant taken from said individual prior to said point in time of step (b), optionally wherein said reference amount is determined prior to said contacting in step (a), (ii) a reference amount of said blumenol marker determined in a sample from an aerial part of said second plant wherein said second plant is free of any association with an AMF, and (iii) a reference amount wherein said amount is a value taken from a knowledge base and said value is a baseline value;

(d) obtaining a difference between said amount determined in step (b) and said reference amount of step (c), wherein a higher amount of said blumenol marker in said sample from said contacted first plant determined in step (b) as compared to said reference amount of step (c) is indicative of said AMF having said colonization capability for said first plant and said difference of step (d) is a measure of said colonization capability; and (e) selecting each of said contacted first plant for having said higher amount of said blumenol marker in said sample determined in step (b) as compared to said reference amount of step (c), thereby selecting said AMF having colonization capability for said first plant.

7. The method of claim 6, wherein step (a) comprises selecting a plurality of AMFs comprising at least two different AMF species, and contacting at least one said first plant known to be receptive to colonization, and selecting each said AMF for having said colonization capability.

8. A method of producing a mycorrhizal association of a plant with an AMF, said method comprising:

(a) providing at least one first plant wherein said first plant is a vascular plant selected from a *Nicotiana* plant, a *Triticum* plant, a *Hordeum* plant, and an *Oryza* plant, and contacting said first plant with an AMF;

(b) selecting a point in time between about two weeks and about ten weeks after said contacting in step (a) and determining the amount of a blumenol marker for mycorrhizal association in a sample from an aerial part of said contacted first plant at said point in time, wherein said blumenol marker is 11-hydroxyblumenol-C-9-O-Glc, wherein said determining comprises taking a sample from said aerial part and measuring the amount of said blumenol marker;

(c) obtaining a reference value selected from one of (i) a reference value determined for a second plant wherein the second plant is the same individual as said contacted first plant of step (a) at a different point in time, wherein said reference value is the amount of said blumenol marker determined in a sample from an aerial part of said individual taken from said individual prior to said point in time of step (b), optionally wherein said reference amount is determined for said individual prior to said contacting in step (a), (ii) a reference value determined from a second plant of the same species, wherein said second plant is free of any association with an AMF and said reference value is the amount of said blumenol marker determined in a sample from an aerial part of said second plant, and (iii) a reference value taken from a knowledge base, wherein said reference value is a baseline value for a plant of the same species;

(d) comparing said amount of said blumenol marker in said contacted first plant determined in step (b) and said reference value of step (c) to obtain a difference between said amount in said contacted first plant and said reference value; and (e) selecting each said contacted first plant for it having an amount of said blumenol marker determined in step (b) that is increased as compared to said reference value of step (c) and, thereby, having a mycorrhizal association, thereby said selected first plant thereby produces said mycorrhizal association.

9. The method of claim 1, comprising determining said amount of said blumenol marker in each said aerial part of each said first plant and second plant using a mass spectrometer configured for the quantitative analysis of a blumenol as defined in claim 1.

10. The method of claim 8, wherein step (a) comprises contacting said first plant with a plurality of AMFs comprising at least two different AMF species, step (b) comprises determining the amount of said blumenol marker in a sample from an aerial part of said contacted first plant at said selected point in time, and step (e) comprises selecting each said contacted first plant for having an increased amount of said blumenol marker determined in step (b) compared to said reference value of step (c), wherein each said selected said first plant thereby produces a mycorrhizal association of said plant with at least one AMF of said plurality of AMFs.

11. The method of claim 8, wherein step (a) comprises contacting a plurality of said first plants with an AMF, step (b) comprises determining the amount of said blumenol marker in a sample from an aerial part of each said contacted first plant at said selected point in time, and step (e) comprises selecting each said contacted first plant for having an increased amount of said blumenol marker determined in step (b) compared to said reference value of step (c), wherein each said selecting thereby produces a mycorrhizal association of said selected plant with said AMF.

12. The method of claim 4, wherein said first plant and said second plant are the same individual at different points in time according to step (c)(i) and said method comprises monitoring mycorrhization status by determining said mycorrhizal association in said individual at two or more time points, wherein the amount of said blumenol marker in said sample from said individual at each time point is indicative of the degree of mycorrhizal association of said individual at each said time point.

* * * * *